United States Patent
Sadeghi et al.

(10) Patent No.: US 11,483,781 B2
(45) Date of Patent: Oct. 25, 2022

(54) CHANNEL USAGE INDICATION AND SYNCHRONIZATION FOR LTE OPERATION IN UNLICENSED BANDS

(71) Applicant: InterDigital Patent Holdings, Inc., Wilmington, DE (US)

(72) Inventors: Pouriya Sadeghi, San Diego, CA (US); Janet A. Stern-Berkowitz, Little Neck, NY (US); Moon-il Lee, Melville, NY (US); J. Patrick Tooher, Montreal (CA); Marian Rudolf, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/387,040

(22) Filed: Apr. 17, 2019

(65) Prior Publication Data

US 2019/0246366 A1     Aug. 8, 2019

Related U.S. Application Data

(63) Continuation of application No. 15/514,174, filed as application No. PCT/US2015/051995 on Sep. 24, 2015, now Pat. No. 10,313,990.

(Continued)

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0048* (2013.01); *H04L 5/0053* (2013.01);
(Continued)

(58) Field of Classification Search
CPC .... H04L 5/0048; H04L 5/0053; H04W 56/00; H04W 56/001; H04W 72/042; H04W 72/0453; H04W 76/27
See application file for complete search history.

(56) References Cited

U.S. PATENT DOCUMENTS 6,823,193 B1   11/2004   Persson et al.
9,445,420 B2    9/2016   Guo et al.
(Continued)

FOREIGN PATENT DOCUMENTS

CN   101730257 A   6/2010
CN   103037431 A   4/2013
(Continued)

OTHER PUBLICATIONS

3rd Generation Partnership Project (3GPP), R1-134332, "Cell State Transition and Small Cell Discovery", ETRI, 3GPP TSG RAN WG1 Meeting #74bis, Guangzhou, China, Oct. 7-11, 2013, 4 pages.

(Continued)

*Primary Examiner* — Kashif Siddiqui
(74) *Attorney, Agent, or Firm* — Condo Roccia Koptiw LLP

(57) ABSTRACT

Systems, methods, and instrumentalities are disclosed for LTE operation in an unlicensed spectrum (LTE-U). A wireless transmit/receive unit (WTRU) may establish a connection with a first cell on a licensed frequency band. The WTRU may receive a first downlink transmission from a second cell operating on an unlicensed frequency band. The WTRU may determine that a synchronization signal transmission from a third cell operating on the unlicensed frequency band is transmitted using one or more resource elements. The WTRU may perform frequency and/or timing estimation based on the synchronization signal transmission. The WTRU may perform rate matching around the one or more resource elements that correspond to the synchroniza- (Continued)

tion signal transmission. The WTRU may perform rate matching around the one or more resource elements by de-mapping symbols of the downlink transmission.

18 Claims, 9 Drawing Sheets

Related U.S. Application Data

(60) Provisional application No. 62/203,734, filed on Aug. 11, 2015, provisional application No. 62/075,720, filed on Nov. 5, 2014, provisional application No. 62/054,881, filed on Sep. 24, 2014.

(51) Int. Cl.
    *H04W 76/27*     (2018.01)
    *H04W 72/04*     (2009.01)

(52) U.S. Cl.
    CPC ......... *H04W 56/00* (2013.01); *H04W 72/042* (2013.01); *H04W 72/0453* (2013.01); *H04W 76/27* (2018.02)

(56) References Cited

U.S. PATENT DOCUMENTS

| | | | |
|---|---|---|---|
| 9,485,075 B2 | 11/2016 | Xiao et al. | |
| 9,596,667 B2 | 3/2017 | Awad et al. | |
| 9,986,559 B2 | 5/2018 | Bontu et al. | |
| 2011/0274026 A1 | 11/2011 | Huang et al. | |
| 2013/0308504 A1* | 11/2013 | Nimbalker | H04L 5/001 370/281 |
| 2014/0050206 A1 | 2/2014 | Seo et al. | |
| 2014/0126496 A1* | 5/2014 | Sayana | H04L 5/0048 370/329 |
| 2014/0153484 A1* | 6/2014 | Kim | H04L 1/004 370/328 |
| 2014/0192663 A1 | 7/2014 | Rosa et al. | |
| 2014/0204849 A1 | 7/2014 | Chen et al. | |
| 2014/0241150 A1 | 8/2014 | Ng et al. | |
| 2015/0071099 A1 | 3/2015 | Yunjung et al. | |
| 2015/0078190 A1* | 3/2015 | Cheng | H04W 24/02 370/252 |
| 2015/0146644 A1* | 5/2015 | Kim | H04L 5/0048 370/329 |
| 2015/0223254 A1* | 8/2015 | Guo | H04L 1/0013 370/312 |
| 2015/0256307 A1* | 9/2015 | Nagata | H04W 28/22 370/328 |
| 2015/0304995 A1 | 10/2015 | Yi et al. | |
| 2015/0372778 A1 | 12/2015 | Xu et al. | |
| 2017/0325183 A1 | 11/2017 | Zhao et al. | |
| 2018/0091341 A1 | 3/2018 | Sadiq et al. | |

FOREIGN PATENT DOCUMENTS

| | | |
|---|---|---|
| CN | 103580840 A | 2/2014 |
| CN | 103634074 A | 3/2014 |
| CN | 103931133 A | 7/2014 |
| CN | 103959826 A | 7/2014 |
| WO | 2013157872 A1 | 10/2013 |
| WO | 2014/069955 A1 | 5/2014 |
| WO | 2014/073865 A1 | 5/2014 |

OTHER PUBLICATIONS

3rd Generation Partnership Project (3GPP), TS 36.211 V12.1.0, "Technical Specification Group Radio Access Network, Evolved Universal Terrestrial Radio Access (E-UTRA), Physical Channels and Modulation (Release 12)", Mar. 2014, pp. 1-120.

3rd Generation Partnership Project (3GPP), TS 36.212 V12.0.0, "Technical Specification Group Radio Access Network, Evolved Universal Terrestrial Radio Access (E-UTRA), Multiplexing and Channel Coding (Release 12)", Dec. 2013, pp. 1-88.

3rd Generation Partnership Project (3GPP), TS 36.213 V12.1.0, "Technical Specification Group Radio Access Network, Evolved Universal Terrestrial Radio Access (E-UTRA), Physical Layer Procedures (Release 12)", Mar. 2014, pp. 1-186.

3rd Generation Partnership Project (3GPP), R1-121395, "Downlink Control Signaling for CoMP", Renesas Mobile Europe Ltd., 3GPP TSG-RAN WG1 Meeting #68bis, Jeju, Korea, Mar. 26-30, 2012, 4 pages.

3rd Generation Partnership Project (3GPP), R1-124277, "Remaining Details of Control Signalling for DL CoMP", MediaTek Inc., 3GPP TSG RAN WG1 Meeting #70bis, San Diego, USA, Oct. 8-12, 2012, 6 pages.

3rd Generation Partnership Project (3GPP), R1-153201, "Subframe Structure for LAA Downlink", Huawei, HiSilicon, 3GPP TSG RAN WG1 Meeting #81, Fukuoka, Japan, May 25-29, 2015, 5 pages.

3rd Generation Partnership Project (3GPP), TS 36.211 V10.1.0, "Technical Specification Group Radio Access Network, Evolved Universal Terrestrial Radio Access (E-UTRA), Physical Channels and Modulation (Release 10)", Mar. 2011, pp. 1-103.

3rd Generation Partnership Project (3GPP), TS 36.212 V11.2.0, "Technical Specification Group Radio Access Network, Evolved Universal Terrestrial Radio Access (E-UTRA), Multiplexing and Channel Coding (Release 11)", Feb. 2013, pp. 1-82.

3rd Generation Partnership Project (3GPP), TS 36.213 V11.2.0, "Technical Specification Group Radio Access Network, Evolved Universal Terrestrial Radio Access (E-UTRA), Physical Layer Procedures (Release 11)", Feb. 2013, pp. 1-173.

CNIPA, "National Intellectual Property Administration, PRC for Reexamination and Invalidation Examination", Examination Decision on Request for Invalidation (54123) of Chinese Patent No. 201580063144.4, dated Feb. 25, 2022, 23 pages.

* cited by examiner

CHANNEL USAGE INDICATION AND SYNCHRONIZATION FOR LTE OPERATION IN UNLICENSED BANDS

CROSS REFERENCE TO RELATED APPLICATIONS

This application is a continuation of U.S. patent application Ser. No. 15/514,174 filed Mar. 24, 2017, which is the National Stage entry under 35 U.S.C. § 371 of Patent Cooperation Treaty Application PCT/US2015/051995, filed Sep. 24, 2015, which claims the benefit of U.S. Provisional Patent Application No. 62/054,881, filed Sep. 24, 2014; U.S. Provisional Patent Application No. 62/075,720, filed Nov. 5, 2014; and U.S. Provisional Patent Application No. 62/203,734, filed Aug. 11, 2015; the contents of which are incorporated by reference herein.

BACKGROUND

Cellular systems, such as LTE systems, use licensed spectrum. Operators may acquire, e.g. by government auction, the right to utilize a certain part of a frequency band in a certain geographical area for transmission and reception of cellular signals. An operator may have exclusive use of licensed spectrum to provide services to its users without concern for in-band interference by other communication systems. In contrast, unlicensed spectrum remains unclaimed and may be used for a variety of purposes by a variety of users employing a variety of radio access technologies (RATs).

SUMMARY

Systems, methods, and instrumentalities are disclosed for LTE operation in unlicensed spectrum (LTE-U), which may comprise carrier aggregation in licensed and unlicensed spectrums, such as License-Assisted Access (LAA). LTE-U operation may be supported by channel usage indication (e.g. busy signal) and/or synchronization (sync) signaling.

For example, a wireless transmit/receive unit (WTRU) may establish a connection with a first cell on a licensed frequency band. The WTRU may receive a first downlink transmission. The first downlink transmission may be received from a second cell operating on an unlicensed frequency band. The WTRU may determine that a synchronization signal transmission from a third cell operating on the unlicensed frequency band is transmitted using one or more resource elements. The one or more resource elements may correspond to a portion of one or more resource blocks of the downlink transmission from the second cell. The synchronization signal transmission may comprise one or more of a primary synchronization signal (PSS), a secondary synchronization signal (SSS), a physical broadcast channel (PBCH), a cell-specific reference signal (CRS), a channel state information reference signal (CSI-RS), and/or a demodulation reference signal (DMRS).

The WTRU may determine that the synchronization signal transmission from the third cell operating on the unlicensed frequency band is transmitted using the one or more resource elements by receiving downlink control information (DCI) on a downlink physical channel. The downlink physical channel may indicate which resource elements are used for the synchronization signal transmission. The WTRU may perform frequency and/or timing estimation. The frequency and/or timing estimation may be based on the synchronization signal transmission. The WTRU may perform demodulation and/or resource symbol scaling. The demodulation and/or resource symbol scaling may be based on the synchronization signal transmission. The WTRU may determine a power offset. The power offset may be between the synchronization signal transmission and one or more other downlink transmissions. The WTRU may determine a power level of a second downlink transmission based on the power offset.

The WTRU may perform rate matching around the one or more resource elements that correspond to the synchronization signal transmission. The WTRU may perform rate matching around the one or more resource elements when receiving the downlink transmission from the second cell. The WTRU may perform rate matching around the one or more resource elements by de-mapping symbols of the downlink transmission. The one or more resource elements that correspond to the synchronization signal transmission may be skipped during the de-mapping. The WTRU may receive a configuration from the first cell on the licensed frequency band. The configuration may indicate which resource elements will be used by the third cell for transmission of the synchronization signal transmission. The configuration may be received in a radio resource control (RRC) message.

DETAILED DESCRIPTION

A detailed description of illustrative embodiments will now be described with reference to the various Figures. Although this description provides a detailed example of possible implementations, it should be noted that the details are intended to be examples and in no way limit the scope of the application.

Figure 1A:
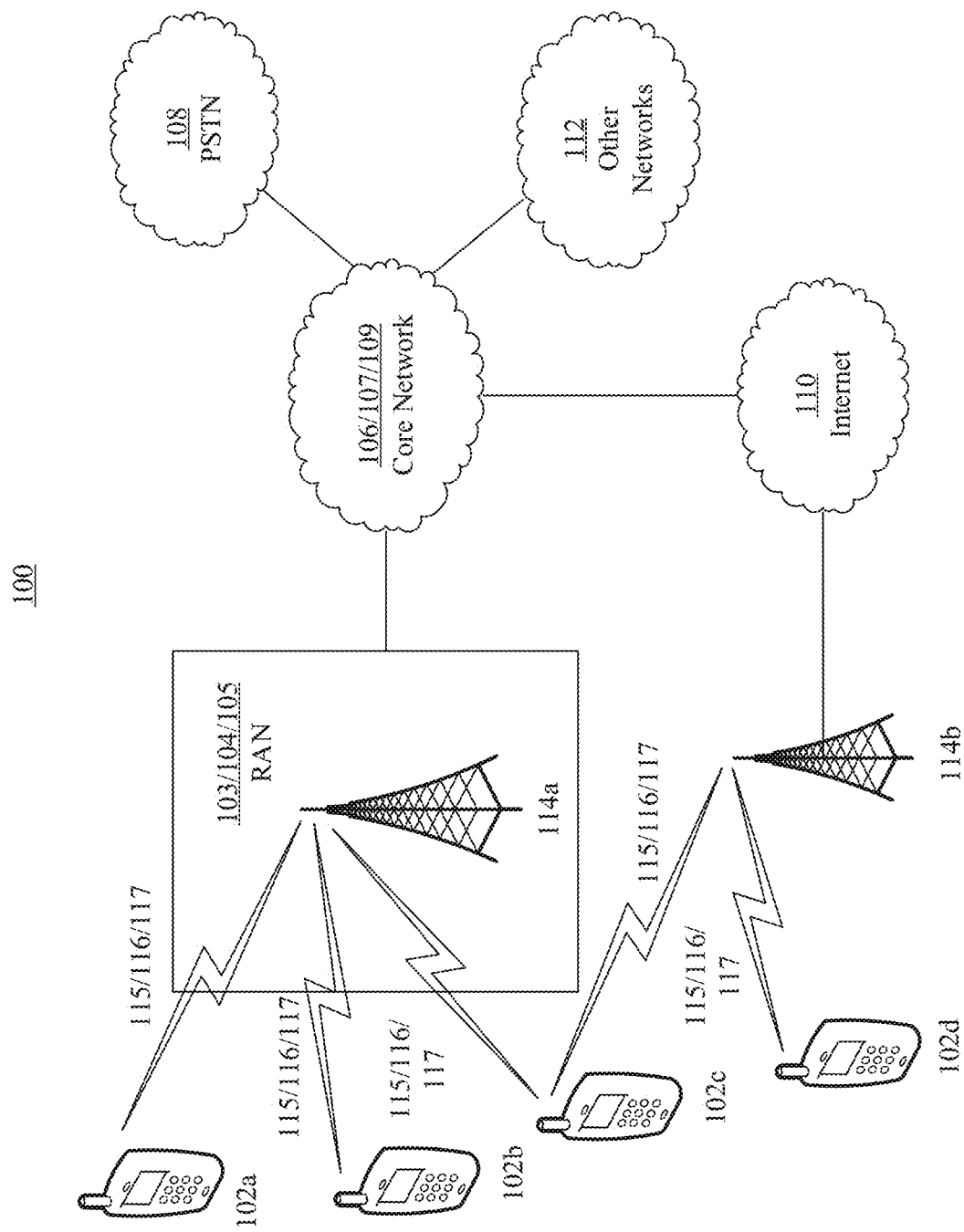
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs), e.g., UEs, 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Base station 114a may include multiple (e.g. three) transceivers, e.g., one for each sector of the cell. Base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

Base station 114a and WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

Base station 114a and WTRUs 102a, 102b, 102c may implement radio technologies, such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

Base station 114b in FIG. 1A may be a wireless router, Home Node B, Home eNode B (eNB), or access point, for example, and may utilize any suitable RAT for facilitating wireless connectivity in a localized area, such as a place of business, a home, a vehicle, a campus, and the like. Base station 114b and WTRUs 102c, 102d may implement a radio technology, such as IEEE 802.11, for example, to establish a wireless local area network (WLAN). Base station 114b and WTRUs 102c, 102d may implement a radio technology, such as IEEE 802.15, for example, to establish a wireless personal area network (WPAN). Base station 114b and WTRUs 102c, 102d may utilize a cellular-based RAT (e.g., WCDMA, CDMA2000, GSM, LTE, LTE-A, etc.) to establish a picocell or femtocell. As shown in FIG. 1A, base station 114b may have a direct connection to the Internet 110. Thus, base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
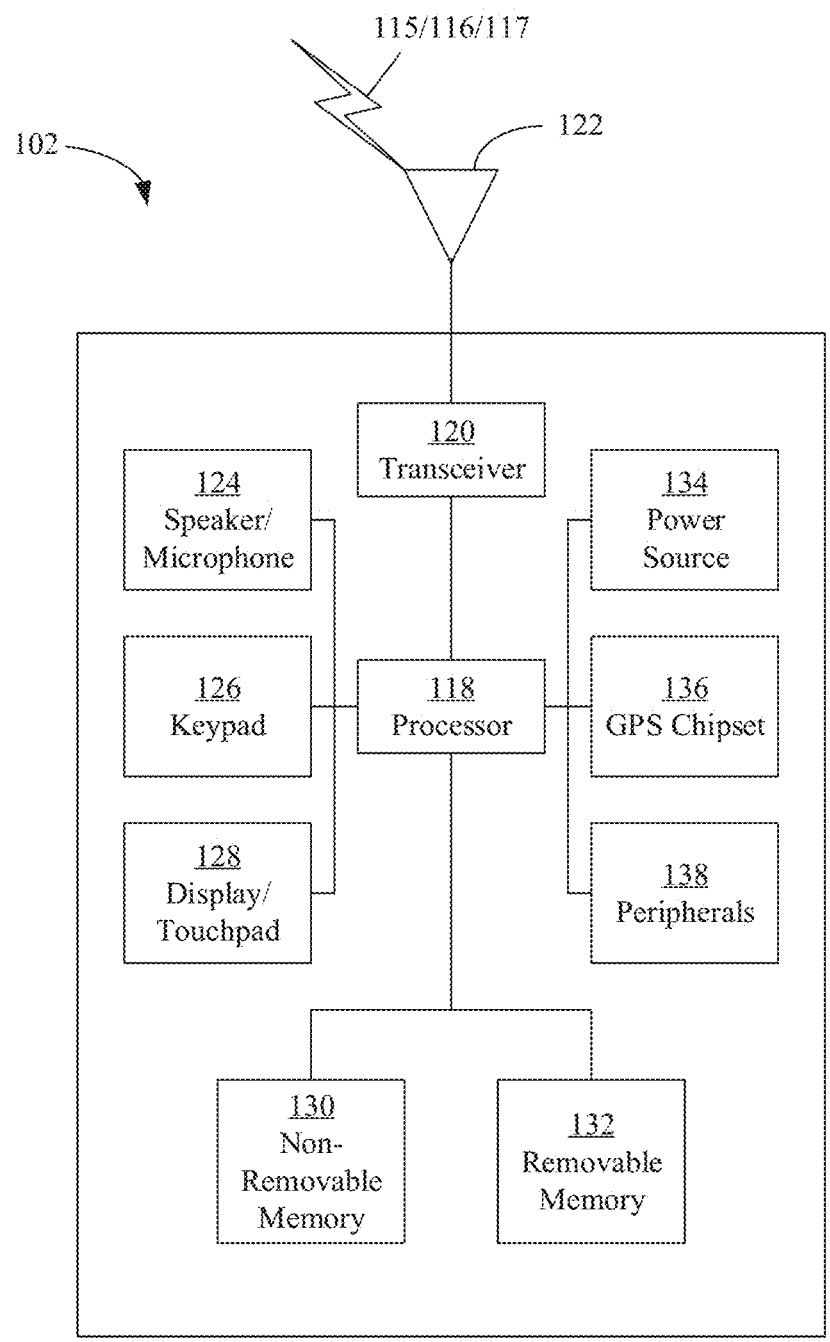
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that WTRU 102 may comprise any subcombination of the foregoing elements. Base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. Transmit/receive element 122 may be, for example, (a) an antenna configured to transmit and/or receive RF signals, (b) an emitter/detector configured to transmit and/or receive IR, UV, or visible light signals, (c) configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. WTRU 102 may comprise two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. Removable memory 132 may comprise a subscriber identity module (SIM) card, a memory stick, a secure digital (SD) memory card, and the like. Processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination implementation.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM)

radio unit, a digital music player, a media player, a video game player module, an Internet browser, and the like.

Figure 1C:
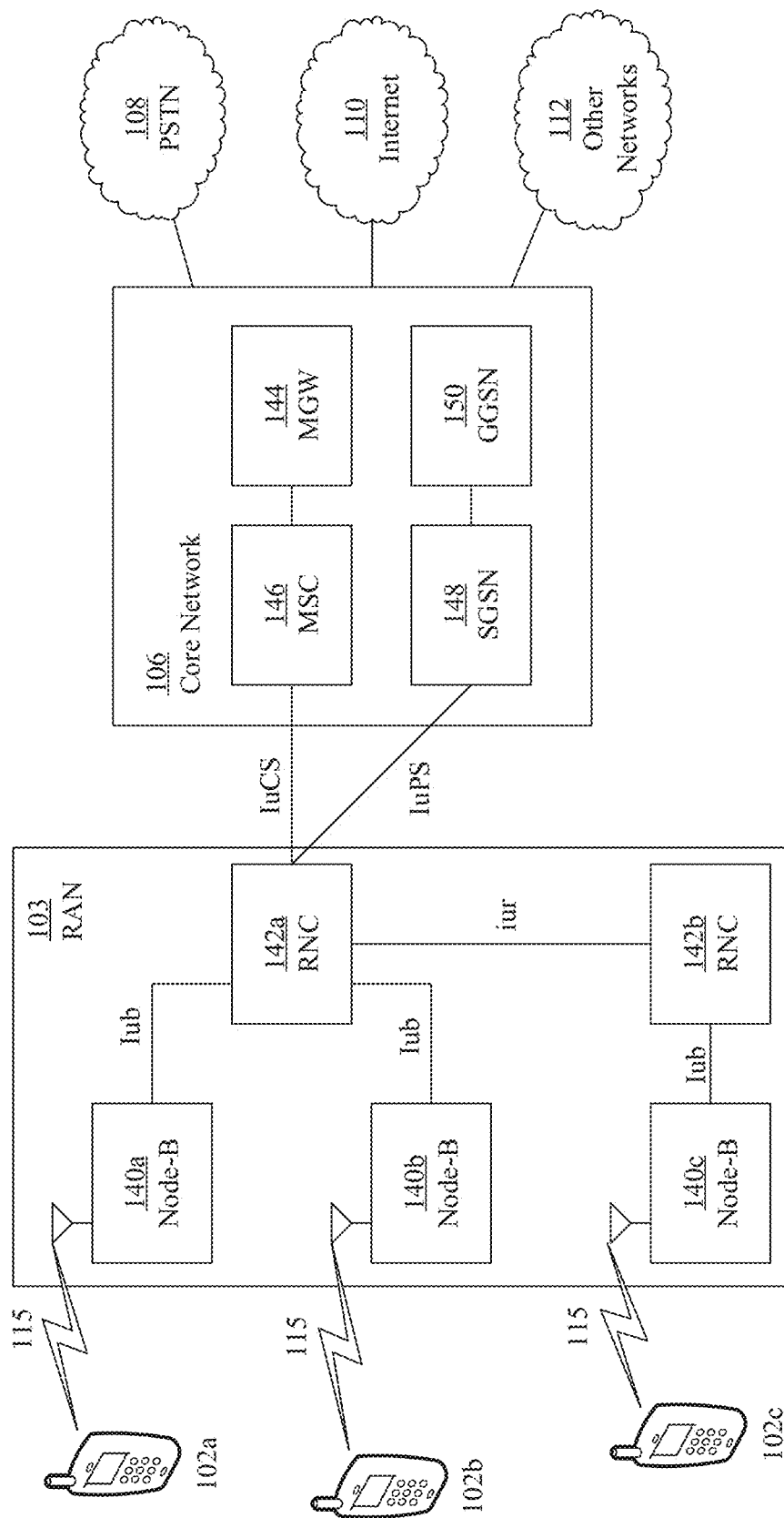
FIG. 1C is a system diagram of an example radio access network and an example core network that may be used within the communications system illustrated in FIG. 1A.

FIG. 1C is an example of a system diagram of RAN 103 and core network 106. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that RAN 103 may include any number of Node-Bs and RNCs.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
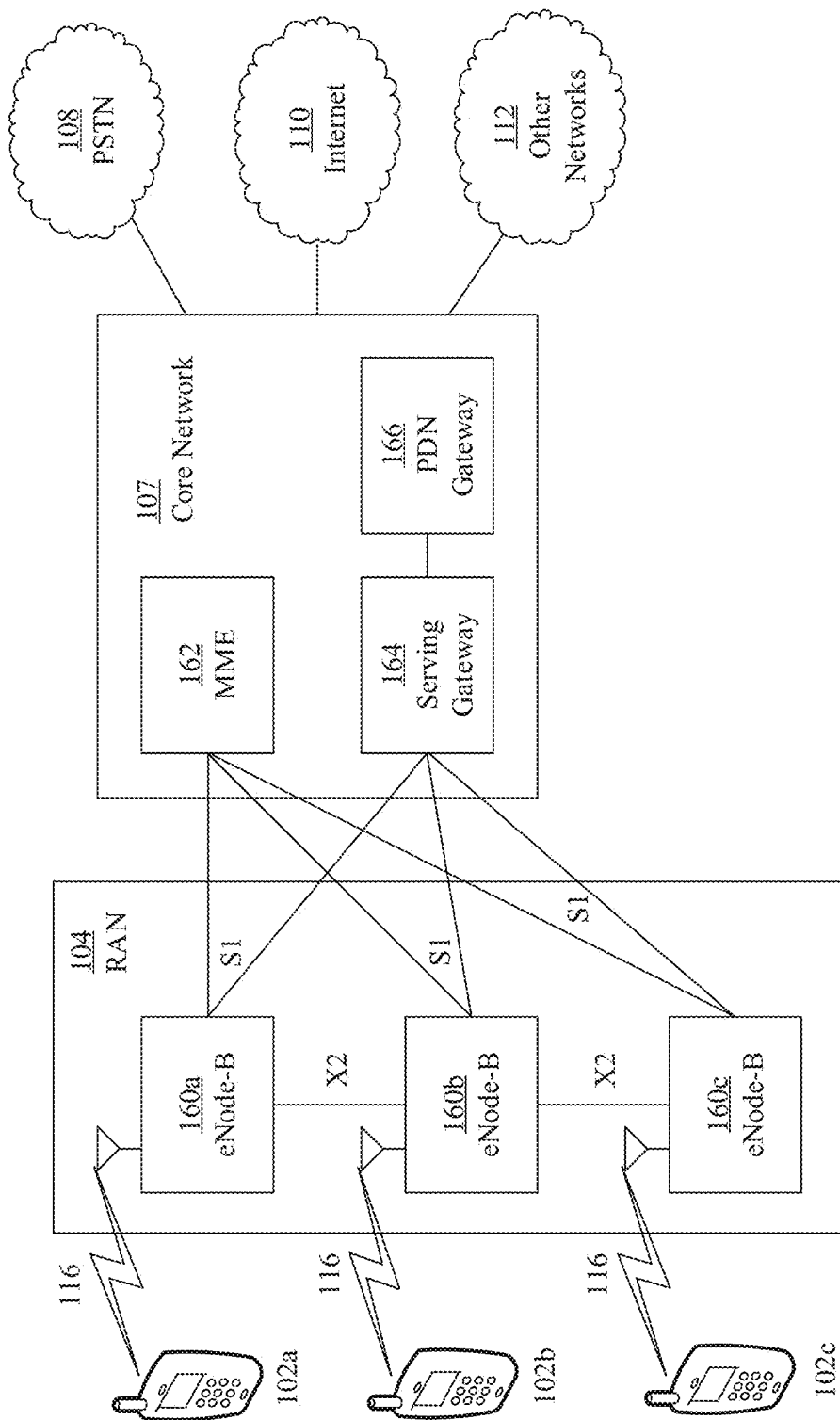
FIG. 1D is a system diagram of another example radio access network and another example core network that may be used within the communications system illustrated in FIG. 1A.

FIG. 1D is an example of a system diagram of RAN 104 and core network 107. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs. The eNode-Bs 160a, 160b, 160c may each include one or more transceivers for communicating with the WTRUs 102a, 102b, 102c over the air interface 116. The eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink (UL) and/or downlink (DL), and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
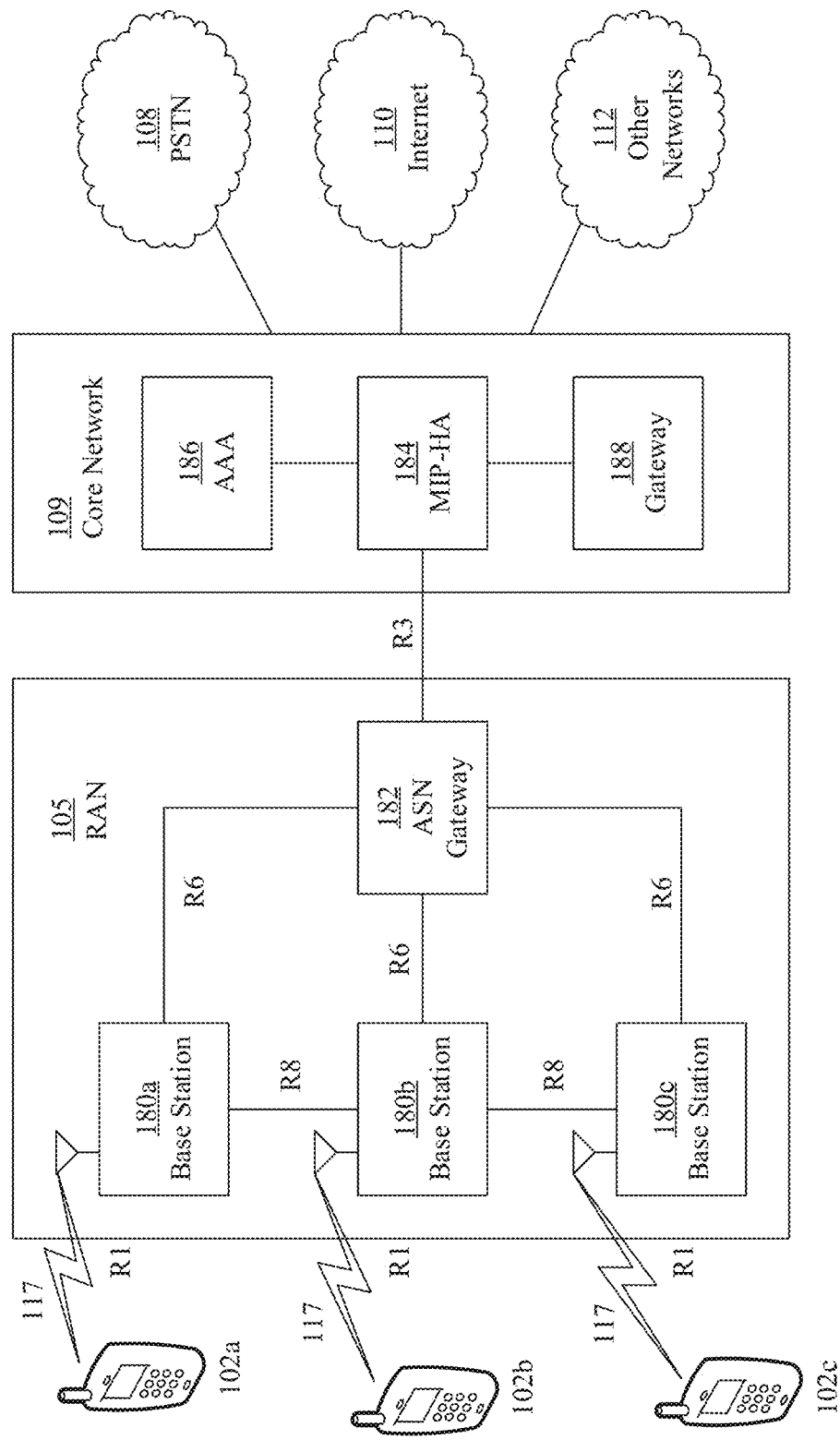
FIG. 1E is a system diagram of another example radio access network and another example core network that may be used within the communications system illustrated in FIG. 1A.

FIG. 1E is an example of a system diagram of RAN 105 and core network 109. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways. The base stations 180a, 180b, 180c may each be associated with a particular cell (not shown) in the RAN 105 and may each include one or more transceivers for communicating with the WTRUs 102a, 102b, 102c over the air interface 117. Base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The use of licensed spectrum may include one or more constraints and an increasing communication demand (e.g., such as for broadband data). Unlicensed spectrum may be used for non-cellular services and/or applications, such as Wi-Fi for example. A portion of unlicensed spectrum may be used by a cellular carrier (e.g., to overcome the one or more constraints and/or to satisfy the communication demand). The unlicensed spectrum (e.g., one or more bands of unlicensed spectrum) may be used for one or more purposes. The unlicensed spectrum may be used by one or more users (e.g., such as a cellular carrier). The one or more purposes and the one or more users may employ multiple radio access technologies (RATs). The use of the unlicensed spectrum for one or more purposes and/or by one or more users may lead to conflicts.

LTE operation in an unlicensed spectrum may be referred to as LTE-Unlicensed operation or LTE-U. LTE-U may be implemented alone (e.g., without support from a carrier operating in a licensed band). LTE-U may be implemented in combination with LTE (e.g., LTE operation in licensed spectrum) and/or other technologies.

An expansion of LTE (or another licensed cellular technology) into unlicensed spectrum may be implemented in a variety of deployment scenarios. For example, a deployment scenario may employ carrier aggregation. For example, carrier aggregation may be used to aggregate a primary (e.g., a licensed) carrier and a secondary (e.g., an unlicensed) carrier. A carrier aggregation deployment scenario may be referred to as "Licensed-Assisted Access" (LAA) to unlicensed spectrum.

Figure 2:
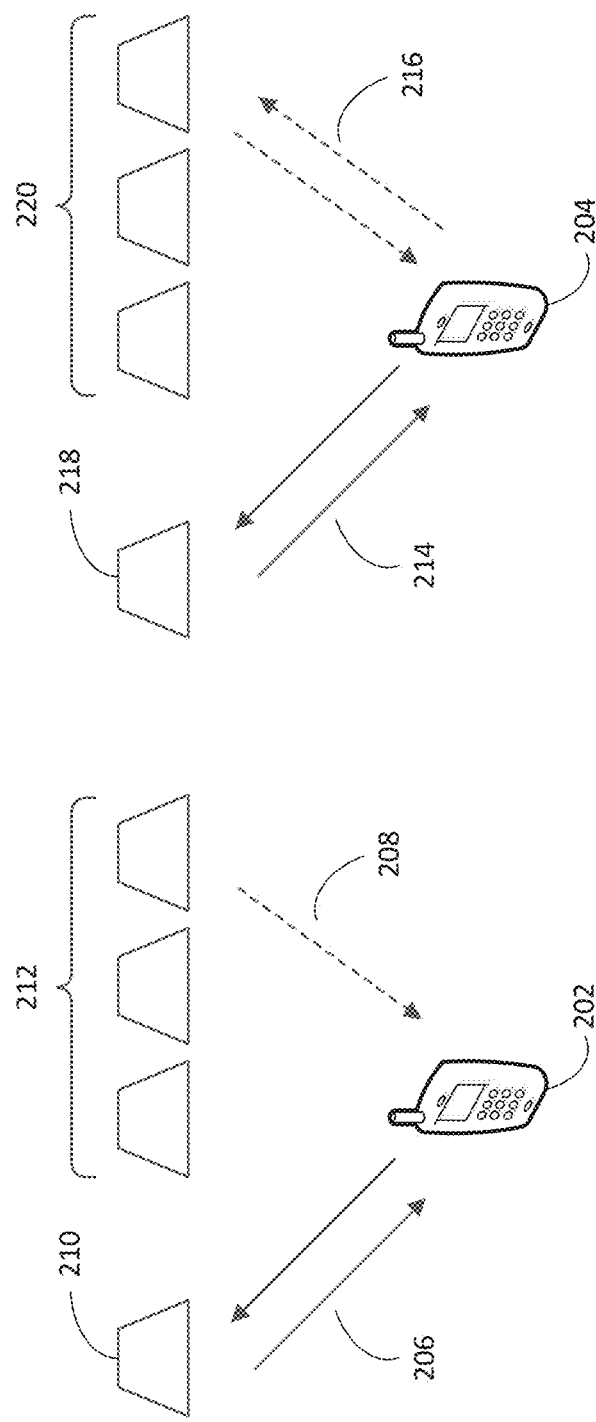
FIG. 2 is a diagram illustrating an example licensed-assisted access deployment.

FIG. 2 is a diagram illustrating an example licensed-assisted access deployment. A WTRU 202 may establish a connection with a primary component carrier 210 (e.g., a primary cell, PCell) and one or more secondary component carriers 212 (e.g., secondary cells, SCells). The WTRU 202 may receive one or more downlink transmissions 208 from the one or more secondary component carriers 212. In LAA, the primary component carrier or serving cell 210 may be a licensed carrier. For example, the primary component carrier 210 may use a licensed spectrum (e.g., a licensed frequency band). The one or more secondary component carriers 212 may include one or more unlicensed carriers. For example, a secondary component carrier of the one or more secondary component carriers 212 may use an unlicensed spectrum (e.g., an unlicensed frequency band). The PCell 210 and the one or more SCells 212 may be aggregated. For example, one or more unlicensed SCells and zero or more licensed SCells may be aggregated together with or without aggregation with the PCell 210. As another example, the PCell 210 and one or more SCells 212 may belong to an eNB.

As shown in FIG. 2, a WTRU 204 may establish a connection with a primary component carrier 218 (e.g., a primary cell, PCell) and one or more secondary component carriers 220 (e.g., secondary cells, SCells). The WTRU 204 may receive downlink and uplink transmissions 216 from the one or more secondary component carriers 220. In LAA, the primary component carrier or serving cell 218 may be a licensed carrier. For example, the primary component carrier 218 may use a licensed spectrum (e.g., a licensed frequency band). The one or more secondary component carriers 220 may include one or more unlicensed carriers. For example, a secondary component carrier of the one or more secondary component carriers 220 may use an unlicensed spectrum (e.g., an unlicensed frequency band). The PCell 218 and the SCell 220 may be aggregated. For example, one or more unlicensed SCells and zero or more licensed SCells may be aggregated together with or without aggregation with the PCell 218. As another example, the PCell 218 and one or more of the SCells 220 may belong to an eNB.

A deployment scenario for LTE-U operation may include dual connectivity. For example, dual connectivity may be used when one or more unlicensed SCells belong to a different eNB than a licensed PCell.

Given that unlicensed spectrum is a public, shared resource, deployments of LTE operation in unlicensed spectrum may address coexistence of LTE with other unlicensed technologies (e.g., Wi-Fi) and/or coexistence with one or more other LTE operators. For example, LTE deployments in unlicensed spectrum may attempt to minimize interference and/or provide fairness among multiple users of the unlicensed spectrum. An LTE deployment into unlicensed spectrum may include one or more coexistence mechanisms (e.g., such as Listen-Before-Talk (LBT) and coexistence gaps).

In an LBT coexistence mechanism, a system node may listen to a channel (e.g., a frequency band with a certain center frequency and bandwidth). The system node may include an Access Point (AP), eNodeB (eNB), user equipment (UE), a wireless transmit receive unit (WTRU), and/or the like. The system node may determine whether the channel (e.g., a portion of the channel) is being used. The system node may determine whether the channel is being used before transmitting on the channel (e.g., a portion of the channel). The system node may perform a listening procedure to determine whether a channel is in-use. The listening procedure may comprise performing one or more measurements. The one or more measurements may include measuring the amount of energy detected in the channel.

In a coexistence gap mechanism, a system node may provide one or more gaps in a transmission. The system node may transmit on a channel or a portion of the channel. The one or more gaps in the transmission may allow other potential users to determine that the channel or the portion of the channel is free for use (e.g., in whole or in part).

LTE-U may be implemented with or without combination with LTE. LTE-U may be implemented with or without aggregation and/or dual connectivity. LTE-U may be implemented with a coexistence mechanism.

When an LTE-U deployment implements one or more coexistence mechanisms, one or more transmission, reception and/or scenario issues may result. For example, one or more transmission gaps and/or air interface differences between LTE and other technologies (e.g., such as Wi-Fi) may result in one or more technical issues.

An unlicensed band (e.g., channel) may be between LTE licensed band boundaries. The unlicensed band or a portion of the unlicensed band may become free (e.g., unused). When the unlicensed band or the portion of the unlicensed band becomes free, an LTE system may use the unlicensed band or the portion of the unlicensed band. An LTE system may indicate (e.g., to ensure WiFi detects the LTE channel usage) the use of the unlicensed band (e.g., so that the Wi-Fi does not transmit on the unlicensed band when the LTE system is using the unlicensed band).

An LTE system may be silent (e.g., when it does not have a channel for data). One or more WTRUs may synchronize with synchronization and/or reference signal transmissions. The synchronization and/or reference signal transmissions may be used or may be available during certain periods of time and during other periods of time the synchronization and/or reference signal transmissions may not be utilized (e.g., there may be no LTE transmissions/there may be silent periods).

One or more terms and phrases may be used interchangeably herein. For example, Wi-Fi, WiFi, and Wifi may be used interchangeably; system and node may be used interchangeably. eNB, cell, SCell, and PCell may be used interchangeably. Unlicensed, license-exempt (LE), LTE-U, and LAA may be used interchangeably. Operate may be used interchangeably with transmit and/or receive. Component carrier may be used interchangeably with serving cell. The terms channel, frequency channel, wireless channel, LE channel, and frequency band may be used interchangeably. Accessing a channel may be used interchangeably with using the channel and transmitting and/or receiving on the channel. Channel and LTE channel may be used interchangeably. Channels and signals may be used interchangeably. The terms data/control may be used interchangeably with data and/or control signals and/or channels. Data/control may be used interchangeably with LTE data/control, data/control and data/control channels and/or signals. eNB and LTE-U eNB may be used interchangeably. Examples described for a WTRU may be performed by and/or be applicable to an eNB or other node. Similarly, examples related to UL access or UL transmissions may also be applicable to DL access and/or downlink transmissions. Band, bandwidth and/or channel may be used interchangeably.

An LAA cell or a SCell may include a cell or a SCell that may use or operate in unlicensed spectrum (e.g., frequency band). An LAA cell or a SCell may be associated with a corresponding PCell. For example, an LAA cell or a SCell may be aggregated with a PCell. A PCell may use or operate in a licensed spectrum. An LAA SCell may be configured for uplink and/or downlink operation. In some examples, an LAA SCell may operate in (e.g., only in) the downlink but not be utilized in the uplink.

An unlicensed channel or an LAA channel may include a band in unlicensed spectrum. A WTRU and/or an eNB may use an LAA channel for data such as DL and/or UL data.

An LTE-U frequency band (e.g., channel) may be used in a license assisted manner. For example an LTE-U frequency band may be used as or by an LAA SCell. An LAA SCell may support an uplink transmission. An LTE-U frequency band may be used without assistance from a PCell in a licensed channel. An LTE-U cell (e.g., such as an LTE-U PCell) may support UL and/or DL transmissions.

A channel may include an LTE channel or signal (e.g., such as an uplink or downlink physical channel or signal). A downlink channel or signal may include PSS, SSS, PBCH, PDCCH, EPDCCH and/or PDSCH. An uplink channel or signal may include PRACH, PUCCH, SRS and/or PUSCH. A channel may include a frequency band. A channel may include a certain amount of spectrum. The certain amount of spectrum may include a center and/or a carrier frequency and a bandwidth. Licensed and/or unlicensed spectrum may include one or more channels that may overlap. Control may include synchronization of the one or more channels.

An LTE-U (e.g., an LAA) eNB may include an eNB or a cell that may transmit and/or receive one or more LTE channels (e.g., physical channels) and/or signals. An LTE-U eNB may operate (e.g., transmit and/or receive signals) in a license-exempt (LE) band. An LTE-U eNB may transmit and/or receive one or more LTE channels and/or signals in a licensed band and/or in an LE band. One or more other radio access technologies (RATs) (e.g., such as Wi-Fi) may operate in an LE band. One or more other LTE-U eNBs and/or one or more WTRUs may operate in the LE band.

A channel usage indication and/or a synchronization (sync) signal may support LTE-U operation. The channel usage indication may include a busy signal.

A busy signal may be used to acquire (e.g., reserve and/or maintain) an unlicensed channel for LTE-U operation. A busy signal may be sent initially upon unlicensed channel usage to indicate that the channel will be used by an eNB and/or a WTRU. A busy signal sent prior to or near the beginning of channel usage may be referred to as an initial busy signal. A busy signal may be used to indicate that the channel usage is ongoing, for example by transmitting the busy signal, while the unlicensed channel usage is ongoing, at predetermined intervals. A busy signal that is sent during channel usage and/or that is sent periodically during channel usage to indicate that the channel usage will continue may be referred to as an ongoing busy signal. A busy signal may be used synchronously or asynchronously. An LTE-type signal may be transmitted as a busy signal.

A busy signal may be configured (e.g., adapted and/or deployed) based on one or more of static conditions, dynamically variable conditions, using resource allocations, using concurrent resource (e.g., PRB) sharing, and/or such that one or more busy signal transmissions may be sent among different users. The static and/or dynamically variable conditions may include a channel overlap between users. The one or more resource allocations may include bandwidth allocations and/or one or more physical resource blocks (PRBs) allocations. A busy signal may be sent with one or more data and/or control signals. One or more resources (e.g., PRBs) used by busy, data and/or control signals may dynamically vary. A busy signal may indicate channel usage information.

A sync signal may be used to acquire and/or maintain synchronization between WTRUs and eNBs for LTE-U operation. An LTE-type signal may be transmitted as an LTE-U sync signal. A sync signal may be configured (e.g., adapted and/or deployed) based on one or more of static conditions, dynamically variable conditions, using resource allocations, and/or using resource sharing in time and/or frequency. Sync signals from different eNBs may be provided (e.g., concurrently) in a set of resources. The sync signals from different eNBs may be provided in the same timeslots and/or Orthogonal Frequency Division Multiplex (OFDM) symbols. Sync signals may be spread in time and/or frequency (e.g., to reduce interference). A sync signal may be rate matched. A sync signal may include a cell-specific and/or a WTRU-specific configuration. A sync signal may be sent with one or more data and/or control signals. One or more resources (e.g., PRBs) used by sync, busy, data and/or control signals may dynamically vary. A sync signal transmission (e.g., indication) may be provided with and/or without blind detection. For example, a sync signal transmission may be sent using one or more patterns and/or implicit indications. A sync signal power offset may be provided. The sync signal power offset may indicate a power offset between a sync signal and one or more other signals (e.g., data signals).

A channel usage indication (e.g., a busy signal) may enable LTE-U operation. For example, an eNB (e.g., such as an LTE-U eNB) may use (e.g., transmit on) a certain frequency band for a certain period of time. The eNB may vacate (e.g., stop using or transmitting on) the frequency band during other periods of time. During a period of time that the eNB uses or may use the channel, the eNB may attempt to prevent others (e.g., APs, other eNBs, WTRUs, and the like) from using the frequency band. The eNB may prevent others from using the frequency band to reduce interference. For example, interference may be caused on an eNB's receiver by other devices (e.g., APs, other eNBs, WTRUs, and the like) in proximity thereto.

LTE operation in unlicensed bandwidth may be inconsistent with the operation of other RATs. For example, a Wi-Fi system may use an entire frequency band (e.g., a 20 or 22 MHz channel) until vacating the channel. A Wi-Fi system with a coexistence technique (e.g., LBT) may expect others to operate as a Wi-Fi system would (e.g., use part, all, or none of the channel). A Wi-Fi system deploying LBT may perform energy detection in a small time window (e.g., 4 us and/or 20 us). A Wi-Fi system deploying LBT may determine whether a frequency band is free for use. The Wi-Fi system may determine whether a frequency band is free for use by performing energy detection in a small time window. The Wi-Fi system may determine to use the frequency band when the Wi-Fi system determines that the frequency band is free for use.

An LTE system may operate in unlicensed frequency band using a time window larger than a RAT (e.g., such as Wi-Fi) LBT measurement window. For example, an LTE subframe may be 1 ms. An LTE system operating bandwidth (BW) may be, for example, 5, 10, or 20 MHz. An LTE system may use a portion of BW and/or may use different portions of BW in different parts of a time window. For example, LTE transmissions may be performed using dynamically variable time-frequency resources. As an example, a PDSCH transmission may span one or more resource blocks (RBs) which may span all or a portion of the system bandwidth. LTE transmissions may be performed across an entire subframe and/or may be performed using a subset of symbols (e.g., OFDM symbols) of a subframe. One or more reference signals (e.g., such as cell-specific reference signals (CRS)) may span the BW (e.g., the entire BW). The one or more reference signals may be present in a subset of symbols of a subframe and/or in a subset of sub-carriers across the system bandwidth.

An LTE Transmission may leave one or more gaps and/or holes in frequency and/or time. Another user and/or system (e.g., such as a Wi-Fi system) may interpret the one or more gaps and/or holes as indications that a frequency band in-use by an LTE-U eNB is free. The frequency band interpreted as free may not be free.

A channel usage indication (e.g., busy signal) may be used to facilitate LTE-U operation by allowing a node (e.g., a WTRU, eNB, etc.) to announce channel usage. For example, an eNB (e.g., such as an LTE-U eNB) and/or a WTRU may transmit a signal (e.g., a channel usage indicator or busy signal). The signal may be transmitted in all or part of a frequency band. The signal may be transmitted for a certain period of time. The signal may indicate that the frequency band is busy. The signal may be received by one or more potential users of the frequency band. The signal may indicate that the frequency band is busy when, for example, the frequency band is in use (e.g., transmission and/or reception in progress in all or part of the channel), the frequency band is intended for use (e.g., transmission and/or reception may be planned), and/or the frequency band is reserved for use (e.g., intended and/or reserved for current and/or future transmission and/or reception) by an eNB and/or one or more WTRUs.

A busy signal may be (e.g., or may be intended to be), for example, received, measured, decoded, read, detected, and/or sensed by a user or a potential user of a frequency band. The devices operating on the frequency band that are in a range proximal to a device (e.g., an eNB or a WTRU) transmitting the busy signal may interpret the busy signal as an indication that the channel is in use for LTE-U transmissions. When a device receives, measures, decodes, reads, detects, and/or senses a busy signal, the device may determine to not attempt to access (e.g., transmit on or use) the frequency band. For example, an LTE-U device (e.g., an LTE-U eNB or an LTE-U WTRU) may access the channel simultaneously (e.g., concurrently) with the device transmitting the busy signal.

A busy signal may have one or more characteristics as described herein. A busy signal may include an initial busy signal and/or an ongoing busy signal. A device may send an initial busy signal when the device accesses (e.g., initially uses) and/or intends to access a frequency band. For example, an initial busy signal may be sent after an initial determination that a frequency band is free. An ongoing busy signal may be sent when the device is using a frequency band and/or intends to keep the frequency band. One or more characteristics of an initial busy signal may correspond to one or more characteristics of an ongoing busy signal.

A busy signal sent by a first eNB may be transparent to one or more WTRUs and/or a second eNB. The one or more WTRUs and/or the second eNB may not be aware of (e.g., be informed of) one or more of the characteristics and/or content of the busy signal.

When a device takes and/or keeps a frequency band, the device may act to prevent (e.g., with an intention to prevent) one or more other devices from using the frequency band. Taking and/or keeping a frequency band may comprise sending an indication that the channel is and/or may be one or more of in use, intended for use, or reserved for use. Taking and/or keeping a frequency band may comprise using or transmitting on the frequency band (e.g., a frequency channel). A device may take and/or keep one or more frequency bands. A device may send one or more signals and/or one or more busy signals. The one or more frequency bands and/or signals may comprise one or more LTE channels and/or signals.

An active time for a frequency band (e.g., a frequency channel) may include a time during which one or more signals (e.g., a busy signal) may be transmitted on and/or using the frequency band. An eNB may be transmitting on a frequency band during active time.

Whether or not an LTE-U cell is active (e.g., may be indicated to a WTRU. For example, whether the LTE-U cell is active may be indicated by physical layer signaling on the LTE-U cell and/or the associated or aggregated PCell and/or by the presence of a busy signal. The LTE-U cell may be active when the LTE-U cell has a frequency band and/or uses or intends to use a frequency band. In an example, an indication may indicate (e.g., explicitly indicate) one or more aspects of an active time. The one or more aspects of an active time may include a start of the active time, an ongoing active time, and/or an end of the active time. A busy signal may indicate whether an LTE-U cell is active.

An active time may be replaced by another time (e.g., which may or may not be a specific or certain time). For example, an LTE-U eNB may activate an LTE-U cell on-demand (e.g., rather than specifying a specific active time for an LTE-U cell). The LTE-U eNB may activate the LTE-U cell on-demand based on one or more first triggering criteria. The LTE-U eNB may deactivate the LTE-U cell based on one or more second triggering criteria. The amount of time the LTE-U cell is active may vary based on one or more criteria (e.g., observed criteria). A busy signal during a period when the LTE-U cell is active may indicate the amount of time the LTE-U cell is active.

An eNB may intend to transmit and/or receive on an unlicensed frequency band (e.g., channel). The eNB may monitor the unlicensed frequency band. The eNB may monitor the unlicensed frequency band until it becomes available. One or more other devices (e.g., users, such as other LTE-U eNBs, WTRUs, and/or WiFi stations or APs) may compete for use of the unlicensed frequency band. An LTE-U eNB may determine (e.g., observe) that the unlicensed frequency band is available (e.g., the unlicensed frequency band appears to be free). When the LTE-U eNB determines that the unlicensed frequency band is available, the LTE-U eNB may (e.g., quickly) take the unlicensed frequency band. Taking the unlicensed frequency band may comprise using the unlicensed frequency band and/or indicating that the unlicensed frequency band is busy. The LTE-U eNB may indicate that the unlicensed frequency band is busy by using an initial busy signal.

For example, an LTE-U eNB may send an initial busy signal with synchronous and/or asynchronous timing (e.g., DL timing) for operation with and/or on an unlicensed frequency band. An eNB may take a frequency band at a time that corresponds to an LTE time structure and/or an LTE time boundary (e.g., such as the start of an LTE symbol, timeslot (TS), subframe (SF), and/or radio frame).

Busy signal timing may be based on (e.g., a function of) whether synchronous and/or asynchronous timing may be used. An eNB may use DL timing for transmission and/or as a reference for transmission on a frequency band. An eNB may use DL timing for reception on a frequency band. DL timing may include synchronous timing and/or asynchronous timing with respect to another transmission and/or timing. For example, the other transmission and/or timing may include one or more DL transmissions and/or timing of a PCell. The PCell may include an associated or aggregated PCell. For example, the other transmission and/or timing may include one or more DL transmissions and/or timing of a previous active time of the frequency band.

Using synchronous timing, an LTE time structure and/or boundaries for an LTE-U frequency band may correspond to a time structure and/or boundaries of an associated or aggregated PCell. An LTE time structure and/or boundaries for an LTE-U frequency band may correspond to a time structure and/or boundaries of a previous active time of the frequency band (e.g., such as a previous and/or DL transmission by an eNB on the frequency band). Using asynchronous timing, an LTE time structure and/or boundaries for an LTE-U frequency band may not correspond to a time structure and/or boundaries of an associated or aggregated PCell. Using asynchronous timing, an LTE time structure and/or boundaries for an LTE-U frequency band may not correspond to a time structure and/or boundaries of a previous active time of the frequency band.

An LTE-U eNB may use synchronous (Sync) DL timing. Sync DL timing may include a scenario in which a DL timing in a current active time may align with (e.g., correspond to or be synchronized with) timing and/or PCell timing in a previous active time. An eNB may wait until a start of a next symbol, TS, SF, and/or frame to transmit one or more LTE channels (e.g. sync, data, and/or control channels). The start of the next symbol, TS, SF, and/or frame may correspond to a previous active time and/or PCell timing. The one or more LTE channels may be intended for reception by (e.g., sent to) one or more WTRUs. During a wait time, an eNB may transmit a busy signal (e.g., an initial busy signal). The busy signal may indicate to one or more users (e.g., potential users) that the one or more LTE channels may not be free.

Figure 3:
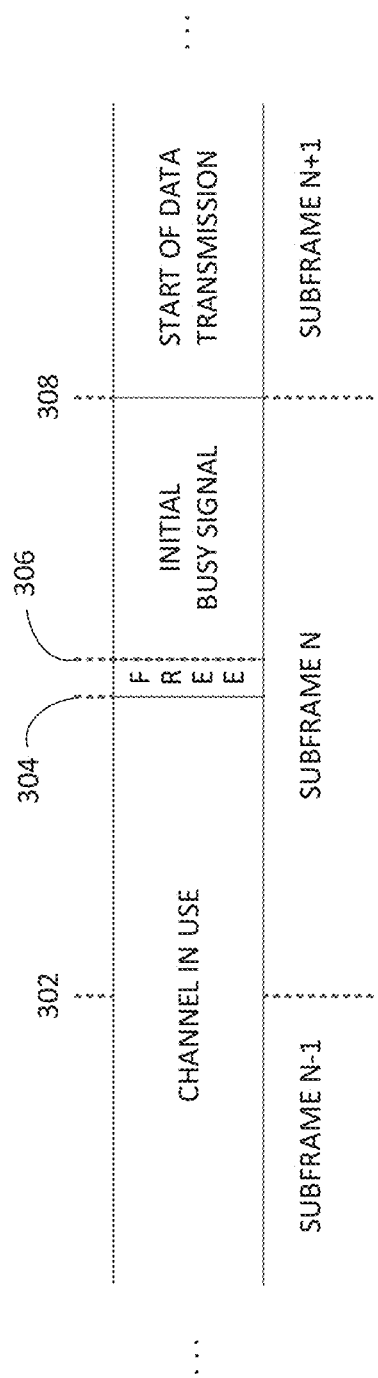
FIG. 3 is a diagram illustrating an example eNB timeline including an initial busy signal.

FIG. 3 shows an example LAA eNB timeline. The example LAA eNB timeline may include a start of subframe n 302. The example LAA eNB timeline may include a first time 304 when the LAA eNB may first observe the channel to be free. The example LAA eNB timeline may include a second time 306 when the LAA eNB may have observed the channel free for a period of time. The period of time may include a channel clearance time frame (e.g., 34 msec). The eNB may transmit an initial busy signal. The initial busy signal may keep the channel until the next subframe boundary. The example LAA eNB timeline may include a third time 308 at an end of Subframe n and a start of a next subframe. The next subframe may be represented by Subframe n+1. At 308, the LAA eNB may stop transmitting the initial busy signal and/or may start transmitting data and/or control signals.

An LTE-U eNB may use asynchronous (Async) DL timing. Async DL timing may correspond to a scenario in which a DL timing in a current active time may not align with (e.g., correspond to or be synchronized with) a timing and/or a PCell timing in a previous active time. A start time for an LTE DL transmission may begin when the eNB determines that the channel is free. The start time for the LTE DL transmission may include a start of a first subframe for a DL LTE channel transmission. The start time for the LTE DL transmission may include a timing offset. An LTE-U eNB using async DL timing may transmit an initial busy signal. An initial busy signal may not be utilized and/or transmitted by the LTE-U eNB, for example, when a timing offset is small (e.g., such as zero and/or lower than the lowest WiFi clear channel assessment (CCA) period). When the timing offset is small, one or more potential users may not see the channel as free before the LTE-U eNB begins DL transmission of one or more LTE channels.

An eNB and/or WTRU may use synchronous and/or asynchronous DL timing based on one or more eNB and/or WTRU capabilities. Use of synchronous and/or asynchronous DL timing may be configurable. An eNB may inform a WTRU (e.g., via signaling, such as radio resource control (RRC) signaling, communicated via an associated or aggregated PCell) whether synchronous and/or asynchronous DL timing may be used and/or what reference timing may be used. Reference timing may include PCell timing and/or a previous active time timing of an LTE-U cell.

Reference timing may include a previous active time timing of an LTE-U cell. An LTE-U cell may include a fixed timing schedule. The fixed timing schedule may exclude one or more effects of timing drift. An LTE-U cell may include a fixed timing schedule when reference timing is the previous active time timing of the LTE-U cell. One or more signals may be sent (e.g., turned on) during an active time. One or more signals may not be sent (e.g., be turned off) during an inactive time. The fixed timing schedule may remain the same during an active time and an inactive time.

An eNB may transmit a busy signal (e.g., an initial busy signal) during a time period. The time period may include a time between a determination that a frequency band is free and a time the eNB transmits one or more LTE channels and/or signals.

An eNB may determine whether a frequency band is free. When an eNB determines that a frequency band is free, the eNB may transmit a busy (e.g., an initial busy) signal until a next LTE DL transmission opportunity. The next LTE DL transmission opportunity may include a next (e.g., a start of the next) valid time unit. The next valid time unit may be according to a Sync DL timing. The next LTE DL transmission opportunity may include an (e.g., a start of the) earliest time unit. A WTRU may receive an LTE DL transmission in or from the earliest time unit. A WTRU may receive an LTE DL transmission, for example, when the WTRU determines a presence of the LTE DL transmission. The WTRU may determine a presence of the LTE DL transmission based on a blind detection and/or based on a reception of an indication of its presence or upcoming presence.

A WTRU may receive an indication of (e.g., be informed of) an upcoming LTE DL transmission on an unlicensed frequency band (e.g., prior to actual transmission). The upcoming LTE DL transmission on the unlicensed frequency band may be indicated, for example, by the eNB or by a DL transmission indication. A DL transmission indication may be signaled on an associated or aggregated PCell. A DL transmission indication may be provided and/or included in physical layer signaling (e.g., such as in or by a PDCCH, EPDCCH, and/or Downlink Control Information (DCI) format).

A time unit may include one or more of a symbol, a timeslot, a subframe, a frame (e.g., a radio frame) and/or an LTE time unit.

An LTE-U eNB may reserve and/or take a frequency band by sending or transmitting a busy signal (e.g., an initial busy signal). A WTRU may detect an LTE signal (e.g., a meaningful LTE signal) and/or a DL transmission. An LTE-U eNB may reserve the frequency band by sending the busy signal until a WTRU detects an LTE signal and/or a DL transmission.

A switching time may include a time between an eNB sensing a free frequency band and a time of transmission (e.g., transmission of the initial busy signal and/or an LTE DL transmission). A switching time may be minimized. A switching time longer than a threshold value may result in a potential user determining that the channel is free. The potential user may attempt to take the channel. The potential user attempting to take the channel may collide with an eNB taking the channel. One or more collision avoidance techniques may be provided (e.g., to reduce the possibility of a collision). The one or more collision avoidance techniques may include a backoff technique. A backoff technique may include a random waiting period before sensing a channel and/or a random amount of sensing time.

A busy signal may include one or more formats. A format of a busy signal may be transparent (e.g., unknown) to one or more WTRUs. A busy signal may be formatted as an LTE signal. For example, an eNB may transmit an LTE signal as a busy signal. One or more random samples and/or signals may be used for a busy signal.

A shortest period of an LTE signal may include one OFDM time period. When a busy signal is transmitted in part of an OFDM symbol, one or more LTE-like time domain samples (e.g., similar to CP) may be used. When a busy signal is transmitted in a portion of an OFDM symbol and one or more full OFDM symbols, one or more sample level signals may be transmitted in the portion of the OFDM symbol and one or more LTE signals may be transmitted in the one or more full OFDM symbols. When a busy signal is transmitted in a portion of an OFDM symbol and one or more full OFDM symbols, one or more sample level signals may be transmitted in the portion of the OFDM symbol and/or the one or more full OFDM symbols.

One or more signals may be used for a busy signal. The one or more signals may be sent in a signal transmission. The one or more signals may be used for a portion of a busy signal. The one or more signals may include PSS, SSS, PBCH, CRS, PDCCH, and EPDCCH. A channel and/or signal used for a busy signal may be transmitted in a time and/or a frequency location that is not typical for LTE. The time and/or frequency location may be repeated.

A density in time of a busy signal may satisfy one or more LBT expectations of a RAT (e.g., WiFi). A busy signal may enable detection of an LTE-U transmission. For example, a busy signal may generate energy in a time window used for CCA (e.g., 20 us) such that detection of an LTE-U transmission is enabled (e.g., by Wifi nodes in proximity).

A busy signal may include one or more specific static and/or dynamic configurations of bandwidth (BW) and/or physical resource blocks (PRBs). The one or more specific static and/or dynamic configurations of BW and/or PRBs may improve a deployment of the busy signal under one or more prevailing conditions, resource allocations and/or other dynamics.

An LTE-U eNB may send (e.g., transmit) a busy signal. The busy signal may include an initial and/or an ongoing busy signal. The busy signal may prevent one or more users (e.g., potential users) of a frequency band from taking and/or accessing the frequency band. The one or more users of the frequency band may include one or more LTE-U eNBs, WTRUs, and/or Wi-Fi users. The one or more users of the frequency band may receive (e.g., sense the presence of) the busy signal (e.g., an ongoing transmission). After receiving the busy signal, the one or more users of the frequency band may not use the channel. The one or more users of the frequency band may use an energy detection (e.g., measurement) to sense the presence of a transmission. For example, detected energy may correspond to interference in the BW of interest.

A user (e.g., a WiFi user) may receive (e.g., only see) a portion of an LTE-U transmission. The portion of the LTE-U transmission may include a portion of energy of the LTE-U transmission. For example, a BW of interest for a user may partially overlap a transmission BW of an LTE-U eNB. When a BW of interest for a user partially overlaps a transmission BW of an LTE-U eNB, the user may determine that the BW of interest is free to access (e.g., even though it may not be free to access). A busy signal may be configured to prevent transmission over a transmission BW of an LTE-U eNB when a BW of interest partially overlaps the transmission BW of the LTE-U eNB.

A data BW may include a full BW of a frequency band configured and/or used for LTE-U (e.g., for the LTE-U SCell). A BW may be, for example, 1.4, 3, 5, 10, 20 MHz or other frequency range. A data BW may include a BW of a frequency band used for an LTE-U session. An LTE-U session may be a finite time period during which an eNB may use, intend to use, or reserve a channel. For example, an LTE-U session may begin when an eNB determines that a frequency band is free. An LTE-U session may begin when an eNB takes a frequency band. An LTE-U session may end when an eNB vacates a frequency band. An eNB may use (e.g., use all or a portion of) a BW during an LTE-U session (e.g., in each subframe of the LTE-U session). The BW may be a data BW. A data BW may be less than a full BW of the frequency band. An eNB may configure a data BW. An eNB may indicate a data BW to one or more WTRU. An eNB may indicate a data BW via signaling (e.g., such as physical layer and/or higher layer signaling).

A BW of interest for a user may overlap (e.g., partially overlap) a full BW and/or a data BW.

An LTE-U cell may transmit a busy signal inside an operating BW. The operating BW may be the full or data BW of an LTE-U frequency band (e.g., an LTE-U channel in use). An LTE-U cell may transmit a busy signal over a BW occupying a portion (e.g., some or all) of an operating BW of an LTE-U frequency band. An LTE-U cell may transmit a busy signal over a BW covering more than an operating BW of an LTE-U frequency band. A BW covering more than an operating BW of an LTE-U frequency band may include a maximum BW.

One or more LTE-U eNBs and/or WTRUs and/or their transceivers may operate on the same frequency band. The one or more LTE-U eNBs and/or WTRUs and/or their transceivers may follow the same channel numerology. A busy signal may be transmitted inside an operating BW of an LTE-U frequency band. A busy signal transmitted inside an operating BW of an LTE-U frequency band may enable a determination (e.g., by an, or another, LTE-U eNB or WTRU) that the LTE-U frequency band is in use. For example, one or more busy signal energy samples may be received over an operating BW (e.g., an aligned operating BW) of an LTE-U channel.

An LTE-U cell may transmit a busy signal (e.g., a portion of a busy signal) outside of a configured or actual data/transmission BW (e.g., the full or data BW) of the LTE-U cell. A busy signal transmission may coincide and/or overlap with all or a portion of a primary channel (e.g., frequency band) of a WiFi system, such as 802.11n and/or 802.11ac. The portion of a primary channel of a WiFi system may be outside a configured or actual data/transmission BW (e.g., the full or data BW) of an LTE-U cell.

A WiFi receiver may measure and/or detect a busy signal. A WiFi receiver may decode one or more signals on a primary frequency band (e.g., 20 or 22 MHz WiFi). The primary frequency band may not coincide (e.g., overlap) with a transmission BW (e.g., the full or data BW) of the LTE-U cell. A primary frequency band may overlap with a busy signal transmission outside of a transmission BW of an LTE-U cell. Measuring a busy signal on the primary channel may provide more reliability than measuring the busy signal on the secondary BW portions of an 802.11n and/or 802.11ac system BW that may coincide with an LTE-U transmission BW.

A busy signal may be configured to be transmitted in a frequency band, channel and/or BW portion(s) that may coincide, overlap, and/or be within (e.g., completely within) an LTE-U frequency band and/or the BW (e.g., the full or data BW) of an LTE-U frequency band.

A busy signal may be configured to be transmitted in a frequency band, channel and/or BW portion(s) that may coincide, overlap, and/or be within a BW larger than an operating BW of an LTE-U frequency band or be within a BW outside the operating BW of the LTE-U frequency band.

A busy signal BW may include a contiguous set of physical resource blocks (PRBs). The busy signal may include non-contiguous PRBs (e.g., within a BW and/or distributed across a BW). A busy signal BW may comprise a fixed BW that may be independent of the data BW, for example 20 MHz or 22 MHz. A busy signal BW may comprise a full BW of a frequency band. A busy signal BW may comprise a data BW. A busy signal BW may comprise a function of a full and/or data BW, such as a certain number of PRBs that may be wider than the full or data BW. A busy signal BW may comprise a function of a cell ID and/or one or more other configured parameters of an LTE-U cell. A busy signal BW may comprise a BW partially or fully overlapping with a full and/or data BW of an LTE-U frequency band. A busy signal BW may comprise a BW partially or fully outside a full or data BW of an LTE-U frequency band.

An initial busy signal may correspond to a first BW. An ongoing busy signal may correspond to a second BW. The first BW may be equal to the second BW.

A busy signal may be transmitted on one or more PRBs. The one or more PRBs may be within a busy signal BW. A busy signal may be transmitted on one or more sets of PRBs. The one or more sets of PRBs may be within the busy signal BW. The one or more sets of PRBs may include one or more sets of contiguous and/or non-contiguous PRBs.

One or more PRBs used for a busy signal may include a function of a cell ID and/or one or more other configured parameters for a cell.

One or more PRBs used by an eNB for a busy signal may change dynamically, I, per subframe and/or set of subframes. For example, an eNB may use one or more PRBs with worst and/or best channel quality for busy signal transmission. The eNB may measure local interference. The eNB may receive one or more reported interference measurements from one or more WTRUs. A channel quality of the one or more PRBs may be determined based on a local interference measurement and/or a reported interference measurement.

A busy signal may be transmitted in one or more fixed or configured sets of PRBs. For example, one or more PRBs may be located at or near the edges of the full or data BW. Other users or potential users, e.g., other LTE-U eNBs, WTRUs and/or WiFi users, that may be operating in an adjacent frequency band with partial overlap with a full and/or data BW, may receive (e.g., detect) one or more busy signal PRB sets.

Figure 4:
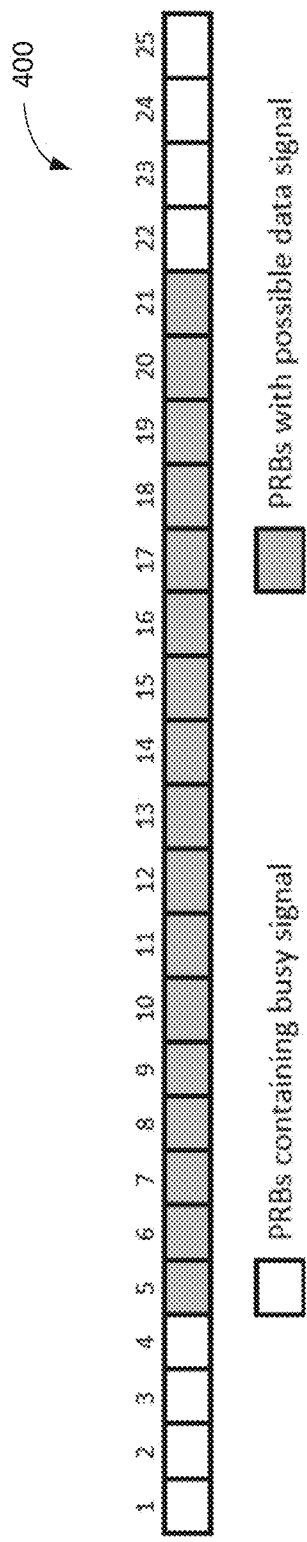
FIG. 4 is a diagram illustrating an example of 25 physical resource blocks (PRBs) shared between busy signal and data transmission.

FIG. 4 shows an example BW 400 of 25 PRBs that may correspond to 5 MHz (e.g., according to a licensed LTE specification). In FIG. 4, the PRBs that may be used for data transmission are shaded. The PRBs that may be allocated to busy signal transmission are not shaded. As shown, the first and last 4 PRBs may send a busy signal transmission. The middle 17 PRBs may be used for data transmission.

A busy signal may include frequency-hopping, for example to cover a frequency-bandwidth. The frequency-bandwidth may correspond to one or more of a fixed BW setting, a configured BW setting, and/or a data bandwidth. The frequency-bandwidth may remain the same for a period of time and/or may vary over a period of time (e.g., as a function of transmission settings).

A frequency-hopping BW, BW portion(s) and/or PRBs for transmission of a busy signal may enable a WiFi receiver with a partial channel overlap to detect that an LTE-U frequency band is in use.

A frequency hopping pattern and/or signaling sequence for a busy signal may be signaled via one or more transmission parameters. A frequency hopping pattern and/or signaling sequence for a busy signal may be derived from one or more transmission parameters.

One or more PRBs of a busy signal may be transmitted, e.g., within the full channel BW or the data BW, according to a pattern. The pattern may include one or more consecutive and/or separate sets of PRBs. For example, a set of PRBs may include N1 consecutive PRBs and/or N2 consecutive PRBs. The N1 consecutive PRBs may be used for busy signaling. The N2 consecutive PRBs may be used for data and/or control transmission (e.g., where the same pattern may be repeated to occupy a full frequency band).

The eNB may signal a pattern and/or a PRB usage for one or more of its busy signals to a WTRU and/or to another eNB. One or more patterns and/or sets of PRBs may be used for busy signals. Signaling a pattern and/or a PRB set usage may include signaling an indication of a pattern and/or a PRB set usage the eNB may be using and/or may intend to use.

Figure 5:
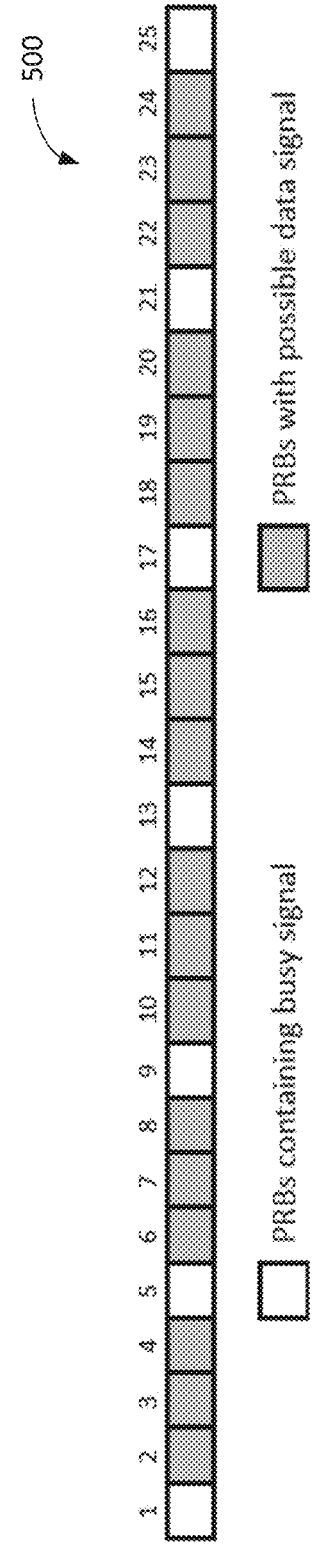
FIG. 5 is a diagram illustrating an example of 25 physical resource blocks (PRBs) shared between busy signal and data transmission.

FIG. 5 shows an example BW 500 of 25 PRBs that may correspond to 5 MHz (e.g., according to a licensed LTE specification). In FIG. 5, the PRBs that may be used for data transmission are shaded. The PRBs that may be allocated to busy signal transmission are not shaded. As shown, 1 PRB out of every 4 PRBs may transmit a busy signal. The busy signal pattern may be represented as "1000" where "1" may represent a PRB which may be allocated to the busy signal and "0" may represent a PRB which may transmit a data signal.

Signaling a pattern and/or PRB set usage may include signaling a bitmap. For example, an eNB may transmit, and a WTRU may receive, a bitmap indication of which PRBs may be used for busy and which PRBs may be used for data/control. For example, for a BW of 25 PRBs, a bitmap indication may include 25 elements where a first state of each bit (e.g., '1') may indicate that the corresponding PRB may be used for a busy signal and a second state (e.g., '0') may indicate that the corresponding PRB may not be used for the busy signal and/or that the corresponding PRB may be used for data and/or control transmission. For example, a bit map may be represented as 1100011000110001100011000. A bitmap may include a pattern that may be repeated, e.g., 11000.

One or more parameters of a busy signal, such as a BW, a number (e.g., a minimum or maximum number) of PRBs that may be used, the locations of the PRBs, and/or the like, may be a function of the frequency channel in which the busy signal may be transmitted. For example, one or more parameters may be a function of, for example, one or more of a channel BW, a channel center frequency and/or a channel number or ID.

An ongoing busy signal may be utilized after an LTE-U eNB takes a frequency band (e.g., channel) and/or after it starts transmitting. An LTE-U eNB may intend to keep the frequency band for a period of time. The period of time may include one or more LTE time units during which the frequency band may not be (e.g., perceived to be) fully used by the LTE-U eNB and/or one or more WTRUs. One or more other users may detect (e.g., sense) that the frequency band is free during the period of time. The one or more other users may transmit on the frequency band.

For example, an idle LTE time unit may occur for a frequency band when an eNB does not transmit in the frequency band in the DL for one or more symbols and/or subframes (e.g., due to a lack of data to transmit). An idle LTE time unit may occur for a frequency band when there is no active UL transmission (e.g., PUSCH, PUCCH and/or SRS transmission) in the frequency band in the UL for one or more symbols and/or subframes. An idle LTE time unit may occur for a frequency band when a TDD UL subframe is not be used (e.g., in the case of LTE-U supporting DL-only). An idle LTE time unit may occur for a frequency band during a TDD UL/DL subframe transition.

An LTE time unit may be perceived to be idle when transmitted signals may not be strong enough to be detected (e.g., as an active user of a frequency band) by other users. The other users may include other LTE-U eNBs, WTRUs, and/or WiFi users. One or more of the other users may perceive a frequency band as being free and/or may try to access and use it.

After an eNB has taken a frequency band (e.g., channel) and/or is ready to transmit or has begun transmitting one or more LTE signals on the frequency band, the eNB may transmit an ongoing busy signal. Other users or potential users, e.g., other LTE-U eNBs, WTRUs, and/or WiFi users, may detect the ongoing busy signal. The other users or potential users may see the frequency band as unavailable, which may enable the eNB transmitting the ongoing busy signal to keep the frequency band.

An ongoing busy signal may be transmitted at a known time unit boundary. An LTE-U eNB may transmit the on-going busy signal during an LTE time unit. The LTE time unit may be idle or may be perceived to be idle. The ongoing busy signal transmission may be followed, e.g., immediately followed, by a period of one or more UL and/or DL channel transmissions by the LTE-U eNB and/or one or more connected WTRUs.

An ongoing busy signal may be used to reserve a frequency band (e.g., channel) for UL transmission (i.e., tx). For example, an eNB may determine whether a frequency band is free, for example using an LBT (e.g., measurement) technique. The eNB may take the frequency band. For example, the eNB may transmit a DL signal having one or more of a busy signal and an LTE DL channel or signal. The eNB may provide a UL grant to a WTRU in subframe n for UL resources in subframe n+k, where k may be 4 for FDD and a function of the UL/DL configuration for TDD. The eNB may continue to transmit in the DL through all or part of subframe n+k−1, for example, to keep the frequency band by making the frequency band appear busy (e.g., continuously busy) until a WTRU takes and/or uses the frequency band for an UL transmission in subframe n+k. The eNB may transmit a busy signal for all or a portion of a time prior to subframe n+k, for example, when the eNB cannot otherwise keep the frequency band busy during that time. An eNB may not be able to keep a frequency band when the eNB does not have enough DL data to transmit to one or more WTRUs.

A busy signal may be transmitted with one or more data and/or control signals. An eNB and/or a WTRU may transmit a busy signal (e.g., such as an on-going busy signal with one or more of LTE data, control, synchronization channels and/or signals.

Busy and data/control signal transmission may be simultaneous. For example, an LTE-U eNB may transmit a busy signal, such as an on-going busy signal, on a frequency band (e.g., an unlicensed frequency channel) when there is no other signal transmitted and/or received by the LTE-U eNB and/or one or more connected WTRUs on that frequency band. Operation of a non-simultaneous on-going busy signal transmission may be similar to an initial busy signal transmission when no data and/or control channels or signals may be transmitted in that LTE-U cell or on that LTE-U frequency band.

An eNB may transmit a busy signal, such as an on-going busy signal on a frequency band (e.g., such as an unlicensed frequency channel) at the same time as it transmits and/or receives a DL and/or a UL LTE channel and/or signal on the same frequency band (e.g., such as in different PRBs of the frequency band).

One or more control channels and/or signals may include one or more synchronization channels and/or signals.

For example, an eNB may transmit a busy signal, such an on-going busy signal, in PRBs (e.g., one or more, or all, PRBs) of an LTE-U frequency band or cell that may not be used for transmission of data and/or control channels or signals within the full or data BW of that LTE-U frequency band or cell.

Figure 6:
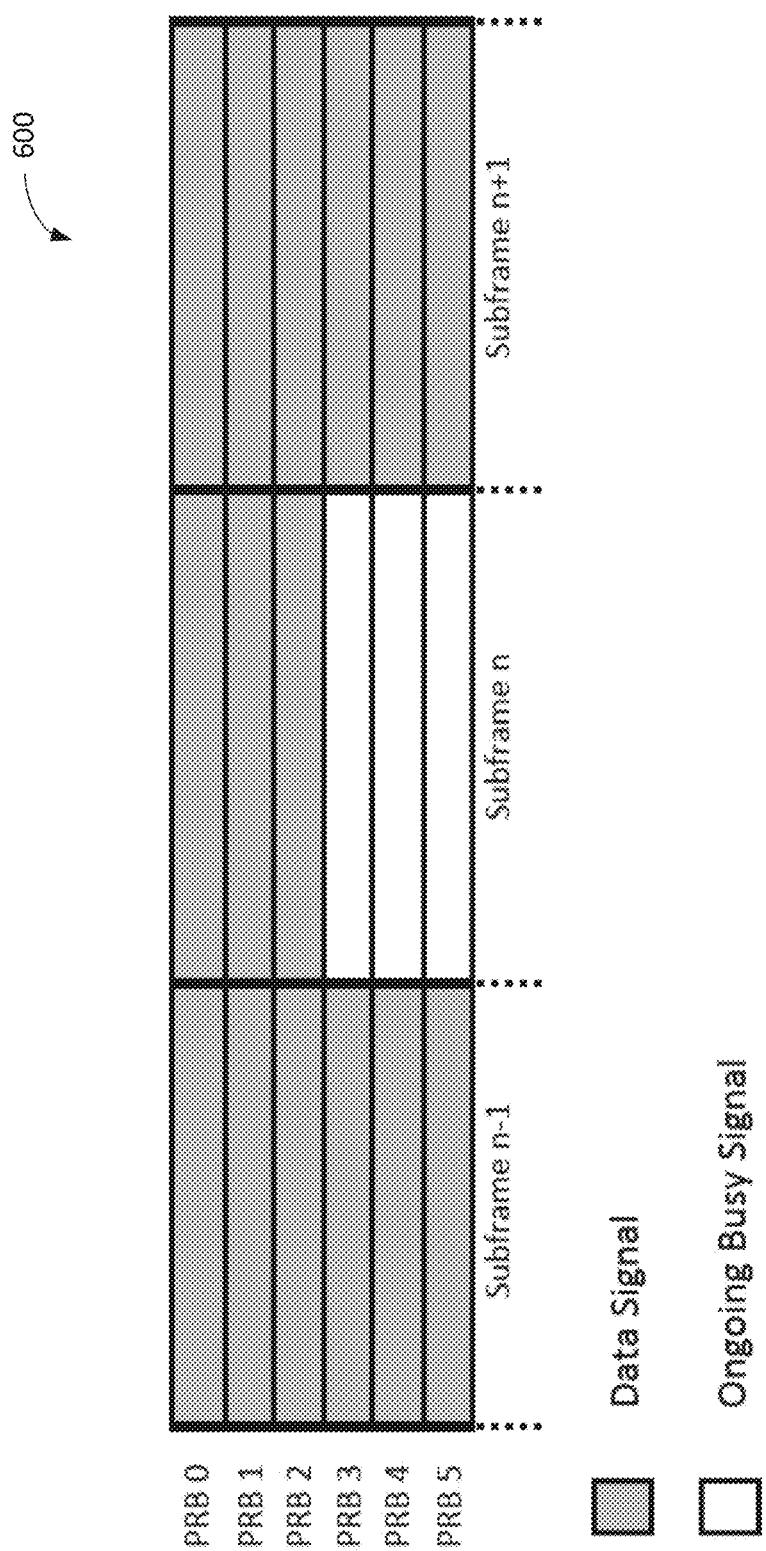
FIG. 6 is a diagram illustrating an example of on-going busy signal and data transmission.

FIG. 6 shows an example of an on-going busy signal transmission 600. For illustration, in FIG. 6, the data signal may be shaded, and the on-going busy signal may not be shaded. An eNB may transmit in a frequency band using a BW of N PRBs for transmission. For example, six PRBs may be used in the example shown in FIG. 6. The eNB may transmit data (and/or control) signals over N PRBs in one or more subframes, e.g., Subframes n−1 and n+1. The eNB may not use the whole BW in a subframe, e.g., Subframe n, for data (and/or control). In the subframe, the eNB may transmit an on-going busy signal in one or more of the PRBs in which it may not transmit data (and/or control) signals, e.g., PRBs 3, 4 and 5 of Subframe n in the figure. An on-going busy signal may enable other users to detect (e.g., better detect) a transmitted signal and/or interpret the frequency band as busy and, for example as a result the other users may not take the frequency band.

An eNB may transmit a busy signal, such as an on-going busy signal, in one or more sets of PRBs regardless of whether the eNB is transmitting any data and/or control signals. The eNB may transmit the busy signal in one or more different sets of PRBs than LTE data and/or control channels are transmitted.

An eNB may (e.g., may always) transmit on a set of dynamically shared PRBs. The dynamically shared PRBs may be dynamically shared between a busy signal and one or more data/control signals. A transmission in a set of PRBs may, for example, include a busy signal and/or one or more data/control signals.

A proportion of busy to data/control signals, e.g., on a set of PRBs, may be different for different subframes. The proportion of busy to data/control signals, e.g., on a set of PRBs, may be a function of the PRBs requested, used and/or scheduled for data/control transmission. The set of PRBs may be the same as a busy signal set of PRBs.

For example, for a set of PRBs designated or used for a busy signal, an eNB may transmit a busy signal in that set of PRBs in the subframe, for example, when no data/control is transmitted and/or intended to be transmitted in a subframe.

For a set of PRBs designated or used for a busy signal, an eNB may not transmit the busy signal in a subframe (e.g., when a number of PRBs that may be transmitted or intended to be transmitted in a subframe for data/control exceeds a number of PRBs in the PRB set). The eNB may allocate and/or transmit the data/control in a subframe in PRBs in the PRB set. The data/control may act as the busy signal.

For a set of PRBs designated or used for a busy signal, the eNB may share the PRB set between the data/control and the busy signal in the subframe, for example, when a nonzero number of PRBs that may be transmitted, or intended to be transmitted, in a subframe for data/control may be less than the number of PRBs in the PRB set. The eNB may allocate and/or transmit the data/control in PRBs that may include all or a portion of the PRBs in the PRB set. The eNB may transmit the busy signal in one or more remaining PRBs of the PRB set.

For a set of PRBs designated or used for a busy signal and another set that may include the remaining PRBs (e.g., in the full or data BW), an eNB may share a set of PRBs between a busy signal and data/control signal transmission, for example, when the number of PRBs that may be transmitted, or intended to be transmitted, in a subframe for data/control may exceed the number of remaining PRBs. The eNB may transmit the busy signal in one or more PRBs of the PRB set that may be available after allocating PRBs in the subframe to data/control. The eNB may not transmit the busy signal, for example, when no PRBs are available after the allocation.

For example, when a full channel (or data) BW may be N (e.g., 100) PRBs, a number of (e.g., the first X and/or the last Y) PRBs may be allocated to or designated for a busy signal. For example, PRBs 0-19 and 80-99 may be allocated to or designated for a busy signal. During an active time, e.g., when an eNB may have a frequency band or may transmit or receive signals on the frequency band, the eNB may send a signal in the number of PRBs allocated to or designated for the busy signal. The signal may be one or more of a busy signal and/or data/control signal. For example, Y may be 0.

An eNB may transmit a busy signal in the first X and/or last Y PRBs, e.g., PRBs 0-19 and 80-99, for example, when an LTE-U eNB has a frequency band and may not have data and/or control to transmit. The eNB may not send a busy signal, e.g., the eNB may use the whole full (or data) BW for data/control signal transmission, for example, when the LTE-U eNB has the frequency band and the eNB may have a full (or data) BW (e.g., 100 PRBs) of data/control to transmit. The eNB may transmit a busy signal in one or more remaining PRBs not used for data/control. For example, the eNB may transmit the busy signal in PRBs 0-4 and 95-99 and may transmit data/control in PRBs 5-94, for example, when the LTE-U eNB has the frequency band and the eNB may have less than a full (or data) BW (e.g., 100 PRBs) of data/control to transmit and/or more than BW−(X+Y) PRBs of data/control to transmit, e.g., 90 PRBs worth of data/control.

To have a frequency band may include using and/or intending to use the frequency band. An eNB may have or may be considered to have a frequency band during an active time of the frequency band for the eNB.

An LTE-U cell may share one or more frequency resources (e.g., such as one or more sets of PRBs) with one or more other LTE-U cells and/or other users, e.g., WiFi users. An LTE-U eNB may not send signals on a set of PRBs that may be used by another LTE-U eNB.

For example, in one or more subframes an LTE-U eNB may not use the whole BW, e.g., one or more or all available PRBs in the full or data BW. The LTE-U eNB may transmit LTE data, control channels and/or signals on a first set of (e.g., one set of) PRBs. The LTE-U eNB may transmit a busy signal on a second, e.g., designated, set of PRBs. The LTE-U eNB may not use a third set of (e.g., a third or remaining set of) PRBs, for example, when there may not be enough data to occupy the full or data BW. The LTE-U eNB may share a frequency band with a second LTE-U eNB. The second LTE-U eNB may use one or more unused PRBs (e.g., the third set of PRBs) for a communication, such as for LTE data and/or control channels (e.g., in the DL).

A frequency band sharing arrangement may be configured by the network, such as by OA&M signaling. The frequency band sharing may be arranged by one or more eNBs. A first eNB may inform a second eNB that the first eNB intends to use a part of an unlicensed frequency band, e.g., for a time period and/or in one or more subframes. For example, the first eNB may signal an intention over X2 to the second eNB. The first eNB may indicate a frequency band usage and/or an intended frequency band usage in one or more of physical layer, MAC and RRC signaling. The second eNB may determine the intention of the first eNB by monitoring the physical layer, MAC and RRC signaling.

An eNB may monitor one or more portions of an LTE-U frequency band to determine usage by an LTE-U eNB and/or WTRU. An eNB may monitor one or more subsets of PRBs of the frequency band to determine an availability of PRBs, for example, when the eNB determines that another LTE-U eNB or an LTE-U WTRU may have the frequency band. For example, when an eNB determines one or more PRBs are available for use and/or sharing, among other scenarios, the eNB may use those PRBs for DL and/or UL transmission. Available may include unused. One or more used PRBs may also be considered available for sharing, for example based on the properties of OFDM or based on expected interference being below a certain threshold.

One or more LTE-U eNBs (and/or WTRUs) that may share, e.g., simultaneously use, an unlicensed frequency band in a subframe, may transmit a busy signal in the subframe. Multiple users of the frequency band (e.g., one or more of the eNBs and/or WTRU) may transmit one or more busy signals simultaneously, e.g., in the certain subframe in the same or different set of PRBs.

Simultaneous transmission of one or more busy signals from different LTE-U users (e.g., eNBs and/or WTRUs) in the same set of PRBs may result in a stronger overall busy signal. A stronger overall busy signal may be detected by other users in the frequency band, e.g., other LTE-U eNBs, WTRUs, and/or WiFi users. A stronger overall busy signal may protect the frequency band from access by the other users.

For example, a first eNB may take a 20 MHz frequency band (e.g., channel) that may include 100 PRBs. The first eNB may transmit a first busy signal on the frequency band. The first eNB may transmit the first busy signal on the edges of the frequency band, e.g., on the first and last 10 PRBs. The first eNB may send the first busy signal on the PRBs $1^{st}$-10th and PRBs $91^{st}$-$100^{th}$. A second eNB may detect and/or be informed of the presence of the first eNB. The second eNB may share the one or more frequency band resources with the first eNB. The second eNB may transmit a second busy signal on the same set of PRBs as the first eNB, e.g., PRBs $1^{st}$-$10^{th}$ and PRBs $91^{st}$-$100^{th}$. The second eNB may monitor a total received power level per PRB on PRBs 11th-$90^{th}$. The second eNB may identify one or more PRBs with a least total received power and/or interference level. The second eNB may transmit data on the identified PRBs, e.g., the one or more PRBs with the least total received power and/or interference among other PRBs. In an example, the second eNB may be provided with and/or may receive a priority PRB usage list from the first eNB. The priority PRB usage list may indicate a priority of the PRB usage by the first eNB for data transmission. The second eNB may (e.g., may only) transmit data on the PRBs on the received priority PRB usage list that have a lower (e.g., lowest) usage priority by the first eNB.

An eNB may use different power parameters for busy signals, e.g., in different subframes. One or more power parameters may depend on whether simultaneous transmission of busy signal and/or data/control signal is supported in a subframe.

A center frequency for LTE-U frequency bands (e.g., channels) may be different than a WiFi channel. A center frequency of an LTE-U frequency band may be determined based on a RAT for another user, e.g., WiFi, channel center frequencies.

Information may be conveyed with, e.g., in, a busy signal. For example, a busy signal transmitted by an LTE-U eNB may carry information that may be useful for another user or potential user of an LTE-U frequency band, such as another LTE-U eNB or a WTRU.

A busy signal may include a control channel, such as a PDCCH or EPDCCH. A control channel, e.g., PDCCH or EPDCCH, may be used as or in place of a busy signal, as part of a busy signal, and/or to provide a function of a busy signal. For example, a busy signal may be replaced by a control channel.

A busy signal may include or otherwise convey information. For example, a busy signal may convey or indicate one or more of the following. A busy signal may indicate how long, e.g., how many additional subframes and/or frames, a transmitter of the busy signal may intend to keep and/or use a frequency band before releasing and/or vacating the frequency band. A busy signal may indicate how long a transmitter of the busy signal has kept and/or used the frequency band, e.g., how many subframes and/or frames ago did the transmitter took (e.g., first take) the frequency band. A busy signal may indicate when or how long ago the first transmission of the busy signal occurred. A busy signal may indicate how much gap time (e.g., a minimum gap time) a transmitter of the busy signal may allow or may intend to allow when it may vacate the channel. For example, the gap time may correspond to one or more of a number of symbols, timeslots, and/or frames. A busy signal may indicate one or more transmission parameters for the data a transmitter of the busy signal may be transmitting and/or intending to transmit, for example, frequency or BW information. The busy signal may convey one or more transmission parameters for the data a WTRU controlled by the transmitter of the busy signal transmits.

A busy signal, PDCCH and/or EPDCCH may convey the information. A mechanism other than a busy signal may be used to convey the information.

Information (e.g., configuration information) regarding one or more transmission parameters of a busy signal, such as time (e.g., one or more subframes and/or frames) and/or a frequency location (e.g., PRBs) may be provided by an eNB that transmits the busy signal. The eNB may provide the information in a broadcast signaling transmission and/or a dedicated signaling transmission to one or more WTRUs and/or eNBs. The broadcast signaling transmission may be sent via a PCell associated and/or aggregated with an LTE-U cell.

An eNB may signal the information, e.g., using RRC signaling, to a WTRU via a PCell, which may be associated or aggregated with an LTE-U cell. An eNB may signal the information to another eNB, e.g., using X2 signaling over an X2 interface.

An eNB may acquire the information regarding another, e.g., neighboring, eNB by reading the broadcast information of the other eNB.

An eNB may provide an RNTI, e.g., by broadcast or dedicated signaling, to a WTRU and/or an eNB. The RNTIh may enable the WTRU and/or eNB to receive and/or decode the contents of a busy signal.

An eNB and/or WTRU may receive and/or decode one or more contents of a busy signal transmitted by another eNB.

An eNB and/or a WTRU may use the information to determine when to take a frequency band. An eNB and/or a WTRU may determine to take the frequency band, for example, when an LTE-U user has the frequency band and simultaneous use may be allowed and/or possible. An eNB and/or a WTRU may determine to take the frequency band when a current user will vacate and the frequency band may be free and/or when or after sufficient gap time may be allowed for other users, and the like.

An eNB and/or WTRU may use the information to determine when not to try to take the frequency band. An eNB and/or WTRU may determine not to take the channel, for example, when an LTE-U user may have it and/or not until gap time is exceeded for other users, and the like.

An LTE-U synchronization (sync) signal may support LTE-U operation. An LTE-U sync signal may be sent in a synchronization signal transmission. In an LTE system, an eNB may transmit one or more reference signals, such as CRS, in one or more (e.g., all) DL subframes. An eNB may transmit one or more synchronization signals in one or more DL subframes of a radio frame. An eNB may transmit the one or more reference signals and/or the one or more synchronization signals in one or more (e.g., all) radio frames.

A WTRU may receive one or more reference signals and/or synchronization signals in one or more DL subframes from an eNB. The WTRU may use one or more of the reference signals and/or synchronization signals (e.g., to acquire and/or maintain a frequency and/or time synchronization with the eNB).

An LTE-U eNB may use an unlicensed frequency band (e.g., channel) periodically and/or aperiodically. The LTE-U eNB may transmit on the unlicensed frequency band for a first period of time. The LTE-U eNB may vacate (e.g., not use) the unlicensed frequency band for a second period of time. The LTE-U eNB may alternate between transmitting on and vacating the unlicensed frequency band. The LTE-U eNB may not transmit DL reference signals and or/synchronization signals in some subframes and/or frames, for example, due to this alternating operation. Intermittent availability of one or more DL reference and/or synchronization signals may prevent a WTRU from achieving time and/or frequency synchronization with acceptable (e.g., reasonable or sufficient) performance.

A wireless transmit/receive unit (WTRU) may establish a connection with a first cell on a licensed frequency band. The WTRU may receive a first downlink transmission. The first downlink transmission may be received from a second cell operating on an unlicensed frequency band. The WTRU may determine that a synchronization signal transmission from a third cell operating on the unlicensed frequency band is transmitted using one or more resource elements. The one or more resource elements may correspond to a portion of one or more resource blocks of the downlink transmission from the second cell. The synchronization signal transmission may comprise a primary synchronization signal (PSS), a secondary synchronization signal (SSS), a physical broadcast channel (PBCH), a cell-specific reference signal (CRS), a channel state information reference signal (CSI-RS), and/or a demodulation reference signal (DMRS).

The WTRU may determine that the synchronization signal transmission from the third cell operating on the unlicensed frequency band is transmitted using the one or more resource elements by receiving downlink control information (DCI) on a downlink physical channel. The downlink physical channel may indicate which resource elements are used for the synchronization signal transmission.

An LTE-U eNB may provide and/or transmit a signal (or a set of signals) for synchronization purposes (e.g., such as frequency and/or timing synchronization). The signal may be used by a WTRU. The WTRU may acquire and/or maintain a frequency and/or timing synchronization with an eNB using the signal. The signal may be referred to as an "LTE-U sync signal" or a sync signal. In an example, an LTE-U sync signal may be different from a PSS and/or SSS used in some LTE systems. In an example, an LTE-U sync signal may include one or more of PSS and/or SSS.

An LTE-sync signal and a busy signal may be implemented and/or presented by the same signal (or set of signals). An LTE-sync signal and a busy signal may include one or more of the same signals.

An LTE-U sync signal may include a particular format. In an example, a time interval of an LTE-U sync signal may be according to one or more OFDM symbols, one or more subframes, and/or one or more frames.

An LTE-U sync signal may be present and/or repeated in one or more OFDM symbols and/or timeslots, for example, in a subframe, at the start of a subframe or prior to the start of a subframe. An LTE-U sync signal may be present and/or repeated in one or more subframes, for example, in a frame.

A WTRU may receive an LTE-U sync signal in one or more OFDM symbols and/or timeslots, for example, in a subframe, at the start of a subframe, or prior to the start of a subframe. A WTRU may receive an LTE-U sync signal in one or more subframes, for example, in a frame. The LTE-U sync signal may be the same, e.g. repeated, in OFDM symbols, timeslots and/or subframes.

For example, the LTE-U sync signal may be transmitted on a number of (e.g., two) OFDM symbols in a set and/or number of PRBs, e.g., a center six PRBs. An LTE-U sync signal transmitted on one or more certain OFDM symbols (e.g., a first OFDM symbol) may be similar to a PSS sequence. An LTE-U sync signal transmitted on one or more other OFDM symbols (e.g., a second OFDM symbol) may be similar to an SSS sequence. An LTE-U sync signal may include one or more of PSS, CSS, PBCH, CRS, CSI-RS, or DMRS.

An eNB may transmit a set of LTE-U sync signals on an LTE-U frequency band (e.g., channel), for example, continuously or in consecutive symbols, a select number of times prior to sending LTE data and/or control signals on the channel.

An eNB may transmit and/or a WTRU may receive an LTE-U sync signal on one or more different frequency resources, e.g., different PRB sets, in one or more different symbols and/or subframes. Transmitting an LTE-U sync signal on one or more different frequency resources may provide a higher frequency diversity gain for an LTE-U sync signal reception.

An LTE-U sync signal may include one or more LTE system signals, such as PSS, SSS, PBCH (e.g. MIB), CRS, CSI-RS, DMRS and the like. The transmission of the one or more LTE system signals as part of an LTE-U sync signal may be according to a symbol and/or a symbol order of the signals in an LTE system.

An LTE-U Sync signal and data may coexist. One or more LTE-U channel resources, e.g., PRBs, may be shared between one or more LTE-U sync signals and/or one or more DL channel signals (e.g., such as control and/or data signals). A WTRU may receive an LTE-U sync signal and/or one or more DL channel signals on a same set of channel resources, e.g., PRB sets.

With respect to LTE-sync signal and data/control time sharing, a WTRU may, for example, receive an LTE-U sync signal and one or more data/control signals in a same set of PRBs. The LTE-U sync signal and the one or more data/control signals may be received in different timeslots and/or OFDM symbols.

For example, where different timeslots are be used, a set of PRBs may be shared between an LTE-U sync signal and one or more data/control signals where a first timeslot may be allocated to the LTE-U sync signal and a second timeslot may be allocated to the one or more data/control signals. The WTRU may receive an indication, e.g., as a part of DL grant, specifying how to detect and/or decode one or more subframes. Sharing may apply to one or more subframes.

For example, one or more different OFDM symbols may be used. An LTE-U sync signal may be transmitted in one or more OFDM symbols (e.g., every one or more, timeslots, subframes and/or radio frames). In an example, the one or more OFDM symbols, or the resource element (REs) of the one or more OFDM symbols, that may be used for an LTE-U sync signal transmission. The one or more OFDM symbols and/or the REs of the one or more OFDM symbols may not be used for LTE data/control signals. For example, an eNB may transmit and/or the WTRU may receive an LTE-U sync signal on a first OFDM symbol of a PDSCH region in one or more, e.g., all, subframes.

A WTRU may be configured by an eNB, for example, via higher layer signaling (e.g., RRC signaling), with which subframes may include sharing of the PRBs for LTE-U sync signals and data/control signals.

An eNB may, for example, transmit and/or a WTRU may receive an LTE-U sync signal and data/control signals in different PRBs. The different PRBs may be in the same subframe and/or timeslot. A WTRU may receive an LTE-U sync signal in a first group of PRBs. The WTRU may receive (e.g., simultaneously receive) one or more data/control signals in a second group of PRBs. For example, the WTRU may expect an LTE-U sync signal to be included in a subset of the PRBs of the subframe.

One or more LTE-U sync signals may be separated, e.g., via code-division-multiplexing (CDM). A first eNB and a second eNB may send respective LTE-U sync signals on a same set of resources, e.g., a same PRB set, at the same time. One or more eNBs in close proximity may cause considerable interference on a reception of an LTE-U sync signal reception by one or more WTRUs. Interference on the reception of the LTE-U sync signal may impact the synchronization performance of the one or more WTRUs. CDM may be used, for example, to reduce inter-cell LTE-U sync signal interference. Scrambling and/or an Orthogonal Cover Code (OCC) may be used.

For example, an LTE-U sync signal may be spread in time and/or frequency by using an OCC. Spreading in time may include repeating a signal in the time domain. Each repetition of the signal may be multiplied by a bit of a corresponding OCC. Spreading in frequency may include repeating a signal in one more PRBs. Each repetition of the signal may be multiplied by a bit of a corresponding OCC. Spreading in time and/or frequency may increase a number of resources allocated to an LTE-U sync signal, which may depend on a length of the OCC. Each eNB may use an OCC for an LTE-U sync signal. The one or more OCCs of one or more eNBs (e.g., eNBs that may be near each other) may be different.

An LTE-U sync signal may be scrambled with a predetermined sequence. The predetermined sequence may be different for different eNBs. For example, a scrambling sequence may be a function of a cell ID and/or a reference sequence for a specific LTE-U cell and/or an associated or aggregated LTE PCell.

An LTE-U sync signal may be configured. An LTE-U sync signal configuration may be indicated. For example, a WTRU may be configured with and/or may receive implicitly and/or explicitly one or more of: an identification of a configured frequency and/or time resources that may be allocated to and/or used for an LTE-U sync signal along with any applicable repetition information; or an indication of a presence or upcoming presence of an LTE-U sync signal.

An LTE-U sync signal configuration/indication may be used to represent a resource allocation and/or presence indication of an LTE-U sync signal. A configuration (e.g., an LTE-U sync signal configuration/indication) may be received by a WTRU. The configuration may indicate one or more resource elements will be used by a cell for transmission of a synchronization signal transmission. A resource allocation may include repetition. A resource allocation and/or presence indication may be provided by an eNB and/or received by a WTRU (e.g., separately or together). The resource allocation and/or presence indication may use the same or different signaling. For example, the resource allocation may be provided by higher layer signaling. For example, the presence indication may be provided by physical layer signaling. The presence indication may not be provided and/or used, for example, when the WTRU may use blind detection to determine a presence of an LTE-U sync signal. The presence indication may not be provided and/or used, for example, when an LTE-U sync signal may be present regularly, e.g., periodically or at known or configured intervals.

An LTE-U sync signal may include a cell-specific configuration and/or indication. An LTE-U sync signal resource allocation may be cell-specific. Two or more WTRUs configured with an LTE-U cell may receive the same LTE-U sync signal resource allocation. The two or more WTRUs configured with the LTE-U cell may expect the LTE-U sync signal in the same time and/or frequency resource locations.

A presence indication may be provided in a cell specific manner (e.g., such as via a DCI format with a common RNTI). A cell-specific presence indication may enable a WTRU to synchronize to or to maintain a synchronization with an LTE-U cell, for example, even when no DL data may be intended for the WTRU.

An LTE-U sync signal may be WTRU-specific, e.g., on-demand. Two or more WTRUs configured with an LTE-U cell may receive the same or different WTRU-specific LTE-U sync signal resource allocations. Two or more WTRUs having different resource allocations may expect an LTE-U sync signal in different time and/or frequency locations.

WTRU-specific LTE-U sync signals may be utilized in one or more scenarios. For example, a WTRU-specific LTE-U sync signal may be utilized when an LTE-U sync signal may be beamformed and/or precoded for a specific WTRU or WTRUs. A WTRU-specific LTE-U sync signals may be utilized when a set of WTRUs may receive LTE-U sync signals, for example, so that other WTRUs without intended data may not try to detect and/or decode the LTE-U sync signal.

A presence indication may be provided in a WTRU-specific manner, such as via a DCI format with a WTRU-specific RNTI (e.g., C-RNTI or another RNTI) or an RNTI intended for a group of WTRUs. A WTRU-specific presence indication may be targeted for one or more WTRUs for which DL data may be intended, for example, at the time of or soon after an LTE-U sync signal. A WTRU-specific presence indication may be provided to enable one or more WTRUs to make one or more measurements, report one or more measurements and/or synchronize to or maintain synchronization with an LTE-U cell.

Two or more LTE-U sync signal configuration/indication mechanisms may be different, for example, depending on whether a WTRU supports blind detection of an LTE-U sync signal and/or whether the LTE-U sync signal is present periodically or at known or configured intervals.

For example, a WTRU may receive an LTE-U sync signal configuration/indication from an eNB via an associated or aggregated PCell, e.g., in the case of LAA.

A WTRU may receive an LTE-U sync signal resource allocation and/or a presence indication from a PCell via physical layer and/or higher layer signaling, for example, via a PCell DL grant (e.g., by means of cross-carrier scheduling or a similar mechanism).

An LTE-U sync signal resource allocation and/or presence indication may be included in physical layer signaling, such as a DCI format on a PCell. A WTRU may monitor a PCell for the DCI format. The DCI format may indicate a presence or upcoming presence of an LTE-U sync signal and/or LTE-U data/control signals.

A cross-carrier scheduled DL grant may be received by a WTRU on the PCell for an LTE-U SCell. The cross-carrier scheduled DL grant may indicate to the WTRU that an LTE-U sync signal may be (or may soon be) present on an LTE-U frequency band. The cross-carrier scheduled DL grant may provide a grant for one or more DL resources for a WTRU on an LTE-U frequency band.

A timing relationship between a presence indicator and a presence of an LTE-U sync signal may be known by the WTRU.

An LTE-U SCell may be time shifted from a licensed PCell by a number of symbols or timeslots (e.g., to allow the WTRU time to synchronize to the LTE-U cell before receiving the granted data).

Upon, following or in response to receipt of physical layer signaling, such as a DL grant, that may indicate the presence or upcoming presence of the LTE-U sync signal, a WTRU may use an LTE-U sync signal to achieve, maintain or correct its synchronization with an LTE-U cell. The WTRU may attempt to receive DL data according to the DL grant. An attempted reception may be simultaneous with and/or after synchronization. Synchronization may use an LTE-U sync signal.

An LTE-U sync signal resource allocation may be received in a DL grant (e.g., to indicate a set of predefined or preconfigured resource allocations to use) or by other techniques, such as via semi-static RRC signaling from an eNB.

A WTRU may receive an LTE-U sync signal, for example, according to a predefined and/or preconfigured pattern of one or more of subframes, timeslots, OFDM symbols, resource elements and/or PRBs. The predefined and/or preconfigured pattern may be referred to as an LTE-U sync signal pattern.

An eNB may provide a configuration. The WTRU may receive the configuration via higher layer signaling, such as RRC signaling. A set of patterns may be defined or may be provided by the eNB. The WTRU may receive the set of patterns via higher layer signaling. Physical layer signaling (e.g., on the PCell) may indicate which pattern may apply at a certain time.

A WTRU may expect an LTE-U sync signal to be present in an LTE-U frequency band (e.g., channel) according to an LTE-U sync signal pattern during an active time of the LTE-U frequency band.

A WTRU may expect an LTE-U sync signal to be present in a LTE-U frequency band according to an LTE-U sync signal pattern whether the LTE-U cell is active or inactive.

One or more indications may be implicit. For example, an eNB may transmit an LTE-U signal and/or a sync signal once and/or more than once every XX+YY ms. XX and/or YY may be configured values, e.g., signaled by the eNB to a WTRU. YY may be 0 or may not be used.

A WTRU may be configured with a PRB set for an expected LTE-U sync signal. The WTRU may expect an LTE-U sync signal in subframe XX+YY from the most recent LTE-U sync signal and/or start of previous active time and/or end of previous active time (e.g. XX=100 ms and YY=1 ms), for example, when the WTRU does not receive an instance of an LTE-U sync signal after XX ms since the most recent LTE-U sync signal and/or start of previous active time and/or end of previous active time.

A WTRU may determine (e.g., derive) one or more signal characteristics as a function of a most recent active time. For example, a number of LTE-U sync signal repetitions, which may be consecutive, may be the same as that which may have been used for a last active time. A number of LTE-U sync signal repetitions, which may be consecutive, may depend on time passed since a most recent active time. The WTRU may expect one instance of the LTE-U sync signal, e.g., no LTE-U sync signal repetition, for example, when the time elapsed is less than a threshold (e.g., 20 ms). The WTRU may expect a number of repetitions (e.g., 2 repetitions) of an LTE-U sync signal, for example, when the time elapsed is more than another threshold (e.g. 100 ms).

A WTRU may periodically or continuously search and/or perform blind decoding for a potential LTE-U sync signal. The WTRU may search for a set of possible LTE-U sync signals. The WTRU may derive some information from the index of an LTE-U sync signal in that set. A limited number of waveforms may be accepted for LTE-U sync signal blind detection, for example, given that blind detection complexity may increase with the number of detection scenarios.

A WTRU may determine (e.g., derive) a start of one or more of an OFDM-symbol, timeslot, subframe, and/or frame, for example, for an LTE-U frequency band. The determination may be a function of a detected timing (e.g., the WTRU's detected timing) for an LTE-U sync signal, for example, for Async DL timing.

An LTE-U cell may share one or more frequency resources, e.g., one or more sets of PRBs, with one or more LTE-U cells and/or other users, e.g., WiFi users. Two or more eNBs may transmit LTE-U sync signals on a same set of PRBs, e.g., overlapping resources, and/or on the different sets of PRBs, e.g., non-overlapping resources.

For example, different LTE-U eNBs may transmit LTE-U sync signals in different sets of PRBs and/or different subframes. Different sets of PRBs and/or different subframe usage for two or more sync signals may ensure there is no resource usage overlap for a sync signal transmission.

A signal for transmission and/or reception may be rate matched around one or more channel resources. For example, an LTE-U eNB may apply rate matching around LTE-U sync signals of other eNBs. Terminology such as "rate match on" and/or "rate match around" one or more channel resources may be used, for example, to refer to or include transmitting or receiving in a manner that skips or does not use one or more channel resources. One or more channel resources may comprise, for example, one or more REs, symbols (e.g., SC-FDMA or OFDM symbols), PRBs, sub-carriers, carriers, time slots, subframes, and/or the like.

A transmitter (e.g., an eNB or WTRU that may transmit or intend to transmit) may rate match a signal (e.g., a signal transmitted or intended for transmission) around one or more channel resources. For example, a WTRU may perform rate matching around one or more resource elements. The WTRU may perform the rate matching around the one or more resource elements when receiving a DL transmission. In an example, rate matching a signal around one or more channel resources may refer to or include a process in which a transmitter may not transmit and/or may not map a DL (or UL) signal in and/or to the one or more channel resources. A transmitter may, for example, skip signal transmission in and/or signal mapping to the one or more channel resources.

A WTRU may perform rate matching around one or more resource elements that correspond to the synchronization signal transmission. The WTRU may perform rate matching around the one or more resource elements when receiving a downlink transmission from a second cell. The WTRU may perform rate matching around the one or more resource elements by de-mapping symbols of the downlink transmission. The one or more resource elements that correspond to the synchronization signal transmission may be skipped during the de-mapping. The WTRU may receive a configuration from a first cell on a licensed frequency band. The configuration may indicate which resource elements will be used by a third cell for transmission of the synchronization signal transmission. The configuration may be received in a radio resource control (RRC) message.

A receiver (e.g., an eNB or WTRU that may receive or attempt to receive) may rate match around one or more channel resources when receiving or attempting to receive a signal. Rate matching around the one or more channel resources may include a process in which the receiver may not expect, receive and/or decode a DL (or UL) signal in one or more channel resources. A receiver may skip signal reception (or attempting signal reception) in one or more channel resources and/or signal de-mapping from one or more channel resources.

An eNB may rate match around one or more LTE-U sync signals of one or more other eNBs. As an example, an eNB may rate match a DL signal (e.g., a data and/or control signal such as PDSCH and/or (E)PDCCH), for example, around one or more (e.g., all) of the channel resources (e.g., REs) of a DL signal of one or more other eNBs, e.g., a neighbor eNB's sync and/or busy signal. For example, an eNB may not transmit a DL signal on one or more channel resources that may be used by a neighbor eNB's sync signal (e.g., in the subframes and/or frames in which the neighbor eNB may be scheduled to transmit its sync signal). Avoiding transmission in the same resources as a neighbor's sync signal may, for example, improve the reception of the neighbor's sync signal (e.g., by WTRUs receiving or attempting to receive the neighbor's sync signal). Avoiding transmission in channel resources used by another eNB may also avoid interference from another eNB's transmission.

During an active time for an LTE-U frequency band (e.g., channel), an LTE-U eNB may not transmit (and/or may not expect to receive, e.g., from a WTRU) a signal, e.g., data, control and/or busy signals, on channel resources (e.g. PRB sets) that may be used for transmission of one or more signals, e.g., LTE-U sync signals, such as by one or more other LTE-U eNBs. During the active time, a WTRU, which may communicate with the eNB on the channel, may not expect to receive (e.g., from an eNB) and/or may not transmit a signal, e.g., data, control and/or busy signals, on channel resources (e.g. PRB sets) that may be used for transmission of one or more signals, e.g., LTE-U sync signals, such as by one or more other LTE-U eNBs. An eNB and/or WTRU may rate match around one or more channel resources (e.g. PRB sets).

An eNB may receive and/or determine sync and/or busy signal information for one or more other eNBs, such as a neighbor eNB. An eNB may determine a time and/or a frequency location of one or more channel resources of sync and/or busy signals of one or more other eNBs, e.g., one or more neighbor eNBs managed by the same operator. For example, an eNB may determine the sync and/or busy signals of another eNB based on one or more of the following factors. An eNB may determine the sync and/or busy signals of another eNB based on receiving the sync and/or busy signal information from a network. An eNB may determine the sync and/or busy signals of another eNB based on receiving the sync and/or busy signal information over an X2 interface (e.g. from another eNB), for example, unsolicited or in response to a request for the sync and/or busy signal information from the eNB. An eNB may determine the sync and/or busy signals of another eNB based on receiving, detecting and/or decoding over-the-air broadcast signals of another eNB. An eNB may determine the sync and/or busy signals of another eNB based on receiving the sync and/or busy signal information from one or more connected WTRUs. As an example, a WTRU may determine the sync and/or busy signal information for an eNB, for example, by receiving, detecting and/or decoding over-the-air broadcast signals of the eNB. Over-the-air broadcast signals may comprise sync and/or busy signals.

An eNB may rate match one or more (e.g., all) of its DL signals around one or more determined time and/or frequency locations of channel resources of sync and/or busy signals of one or more other eNBs.

An eNB may send a request to another eNB for time and/or frequency location(s) of one or more channel resources of a sync and/or busy signal. The request may be sent by an eNB, for example, over an X2 interface. An eNB may send a time and/or frequency location of one or more channel resources of a sync and/or busy signals to another eNB, e.g., unsolicited or in response to a request from the other eNB. The time and/or frequency location may be sent by the eNB, for example, over an X2 interface.

An eNB may send a request to a WTRU for a time and/or frequency location of one or more channel resources of sync and/or busy signals of another eNB. The request may be sent by the eNB, for example, via higher layer signaling, such as RRC signaling. A WTRU may send a time and/or frequency location of the one or more channel resources of sync and/or busy signals of a first eNB to a second eNB, e.g., unsolicited or in response to a request from the second eNB. Information may be sent by the WTRU, for example, via higher layer signaling, such as RRC signaling.

One or more other signals and/or channels may be used, e.g., other than and/or in addition to sync and/or busy signals.

An eNB rate matching and symbol mapping process may be provided. For example, an eNB may rate match a DL signal around one or more REs that may be used by a neighbor eNB, e.g., for sync and/or busy signals. In an example, during a rate matching process an eNB may not map a (e.g. any) data and/or control signal symbol to one or more REs that the DL signal is being rate matched around, such as one or more REs that a neighbor eNB may use for its sync and/or busy signals. An eNB may skip one or more REs that may be used by a neighbor eNB for a sync and/or busy signal in a symbol-to-RE mapping process. Skipping one or more REs may be performed, for example, by placing the modulation symbol that would have been mapped to the RE had it not been skipped in the next available RE, e.g., according to a RE mapping process or rule that may be fixed, pre-configured, known, or determined. The one or more skipped REs may correspond to a sync signal transmission.

An eNB may map data and/or control signal symbols to one or more available REs for data and/or control signal mapping. An eNB may consider an (e.g. any) RE that may overlap with sync and/or busy signals of another eNB, e.g., a neighbor eNB, as an unavailable RE and/or may not use it in its symbol-to-RE mapping process. As an example, an eNB may (e.g. may only) map a block of, possibly encoded, complex value data and/or control symbols to resource elements (e.g. REs within one or more PRB sets) that may not be used for transmission of one or more other eNB's sync and/or busy signals.

Different rate matching configurations (e.g. different arrangement resources that a signal may or should be rate matched around) may affect a total number of useable REs in different subframes. Transport block sizes may depend on a rate matching configuration. As an example, a transport block size (TBS) may be determined, for example, based on a combination of an MCS index and an applied rate matching configuration. In another example, TBS may be independent of a rate matching configuration. A coding scheme may be a function of the TBS and the rate matching configuration.

WTRU reception may be based on applied rate matching and/or symbol-to-RE mapping. A WTRU may determine which channel resources may, and which channel resources may not, carry complex value symbols (e.g. data and/or control symbols) that may be intended for reception by the WTRU. The determination may be made, for example, as a part of the reception of a DL signal that may be rate matched around one or more channel resources (e.g. REs).

A WTRU may determine one or more channel resources (e.g., REs) that may be rate matched around (e.g., by the eNB possibly during the symbol-to-RE mapping process). The determination may be made, for example, as a part of reception of a DL signal transmission that may be rate matched around one or more channel resources (e.g. REs). For example, the WTRU may de-map one or more symbols of a DL transmission. One or more REs that correspond to a synchronization signal transmission may be skipped during de-mapping. The determination may enable a WTRU to de-map the one or more symbols, e.g., reverse an eNB's symbol-to-RE mapping. A WTRU may de-map symbols according to the determination. As an example, in the de-mapping a WTRU may skip one or more REs that were determined to be skipped or rate matched around, e.g., in the DL transmission. Skipping one or more REs when rate matching may enable a WTRU to detect and/or decode transmitted data and/or control DL signal.

An indication of resources that may be rate matched around in a DL transmission may be provided and/or used. The indication may be semi-static or dynamic.

A WTRU may determine one or more channel resources that may be rate matched around based on, for example, configuration or information provided by an eNB, e.g., via signaling, such as physical layer or RRC signaling.

A WTRU may be configured with and/or informed by an eNB or network, e.g., by or via a PCell, which channel resources (e.g., REs, sets of PRBs and/or subframes) may be used for transmission of an LTE-U sync and/or busy signal of one or more other LTE-U eNBs. A WTRU may determine the rate matched around channel resources, for example, based on or according to the received configuration or information.

Configuration with and/or identification of channel resources that may be used by an eNB for sync and/or busy signals may, for example, be the same as configuration with and/or identification of channel resources that may or should be rate matched around.

As an example, a WTRU may receive an indication of one or more channel resources that a DL signal may be or might have been rate matched around (e.g. rate matched around REs) from an (e.g., a serving) eNB. The indication may include an indication of one or more channel resources of a sync and/or busy signal of another eNB.

A WTRU may be configured with and/or may receive an indication that may include one or more time and/or frequency resources (e.g., REs) that an eNB may rate match a DL signal transmission around. A WTRU may be configured with and/or may receive an indication that may comprise information from which the WTRU may determine one or more time and/or frequency resources (e.g., REs) that an eNB may rate match a DL signal transmission around. A configuration, e.g., a configuration related to rate matching, may be sent to a WTRU, for example, in higher layer signaling and/or physical layer signaling such as in a DCI.

A WTRU may receive a configuration from an eNB that indicates a set of channel resources that an eNB may rate-match around when transmitting a DL signal transmission. The set of channel resources may be periodic. A configuration may comprise, for example, time location(s), frequency location(s) and/or one or more transmission characteristics of channel resources. A configuration may comprise one or more of a period of frames or subframes, a frame offset, e.g., for a starting frame, a subframe index or offset, and a timeslot or timeslot offset. A configuration may comprise one or more of a subframe index within one or more radio frame(s), a timeslot index, e.g., within that subframe, the PRBs and/or subcarriers that may be within that timeslot and/or the OFDM or SC-OFDM symbol or symbols that may be within those PRBs and/or subcarriers. A WTRU may (or may understand or be configured to) account for rate matching around the indicated or determined time and/or frequency locations, for example, when receiving and/or de-mapping a DL signal from the eNB.

In an example, a WTRU may receive a subframe indication (e.g., from a serving eNB) for xx number of subframes, e.g., a 40-bit bit-map for xx=40 subframes. A (e.g. each) bit may indicate whether a corresponding subframe in a 40-subframe period may contain a sync and/or busy signal that may be transmitted by another eNB. A WTRU may receive an indication of REs that may be used for another eNB's sync and/or busy signal, e.g., within an indicated subframe. A WTRU may determine (e.g., via configuration) that a DL signal (e.g. from the serving eNB) may be rate matched around one or more configured and/or indicated REs in a subframe, for example, when a subframe is indicated as one in which another eNB may transmit a sync and/or busy signal, such as when the 40-bit subframe bit-map provides an indication.

A WTRU may receive an indication in a DCI, e.g., in a DL grant, that may identify, or may be used by the WTRU to determine, which channel resources may be rate matched around for a DL signal (e.g. a PDSCH associated with the DL grant or a later or other DL signal). As an example, a WTRU may receive a DCI in subframe n indicating rate matched around channel resources in subframe n+m. The value of m may be a fixed value and/or known to a WTRU. The value of m may be indicated to a WTRU in the same DCI or configured by higher layer signaling. An indication may include a bitmap indicating resources that are not to be used for symbol-to-RE mapping and/or de-mapping. A WTRU may be configured (e.g. semi-statically) with a set of possible RE mapping configurations. A DCI, e.g. a DL grant, may comprise an indication (e.g. a codepoint), for example, to indicate what configured mapping a WTRU may assume or use, e.g., in subframe n or n+m.

A WTRU may distinguish between two or more LTE-U sync signals from different eNBs, for example, based on channel resources (e.g. sets of REs, PRBs and/or subframes) that may be allocated to or used by the two or more LTE-U sync signals.

One or more resources may be shared using different subframes. For example, a WTRU may be configured with one or more channel resources (e.g. sets of REs or PRBs), perhaps in different subframes, which may be used for different LTE-U sync signal transmissions.

For example, a single set of PRBs may be allocated to one or more LTE-U sync signals in one or more, all, or a set of subframes. Two or more LTE-U eNBs may use the same set of PRBs for their LTE-U sync signal transmission. However, each LTE-U eNB may transmit in different subset of the subframes. For example, an LTE-U eNB may transmit an LTE-U sync signal on an LTE-U frequency band once every 4 subframes, e.g., during an active time for the LTE-U frequency band. A WTRU may expect the LTE-U sync signal from the LTE-U eNB in a subframe, where two LSB SFN bits in the subframe may be equal to mod(PCell_cell_ID,4) or mod(SCell_cell_ID,4).

One or more resources may be shared using different sets of PRBs. A WTRU may be configured with one or more channel resources (e.g., sets of REs or PRBs) that may be used for LTE-U sync signal transmission by different LTE-U eNBs within the same subframe.

For example, assume N sets (e.g., four sets) of PRBs may be allocated to LTE-U sync signal transmission in one or more, all, or a set of subframes. Two or more LTE-U eNBs may transmit LTE-U sync signals in the same subframe. The two or more LTE-U eNBs may transmit LTE-U sync signals on a different set of PRBs. A WTRU may expect an LTE-U sync signal from an LTE-U eNB in a PRB set, among the configured set of PRBs, with an index that may be equal to mod(PCell_cell_ID,4) or mod(SCell_cell_ID,4).

While the examples herein for may be described in terms of PRB resources, the methods and techniques described herein may be applicable to other types of resource usage. For example, other resources that may be used for LTE-U sync signal transmission, busy signal transmission, data transmission, and/or the like may be identified or defined by resource elements (REs), virtual resource blocks (VRBs), sub-carriers, subframes, codes, other time-frequency resources, etc. Thus, examples disclosed herein that reference resources as PRBs, may be also be applicable to scenarios where resources are defined based on REs or other types of resource definitions (and vice versa).

A first eNB may map data and/or control signal symbols to one or more channel resources (e.g., REs) that a second eNB may use for transmission of its sync and/or busy signal. The first eNB may mute one or more signal transmissions (e.g., perform signal muting) on one or more (e.g., all) of those channel resources (e.g., REs) that are utilized by the second eNB.

Muting transmissions on one or more channel resources (e.g., REs) may be performed, for example, by dropping (e.g., not transmitting or transmitting at zero power) one or more modulation symbols mapped to the one or more channel resources (e.g., REs). One or more other REs of the same signal may not be affected by the presence, location and/or density of the muted REs.

A WTRU may determine and/or be implicitly and/or explicitly informed of a location of one or more muted channel resources (e.g., REs) in time and/or frequency. One or more of the methods described herein for configuring, informing, or determining rate-matched around channel resources may be applied for the one or more muted channel resources.

A WTRU that may be aware of muted channel resources (e.g., REs), such as time and frequency locations, may, for example, cause (e.g., force) one or more received signal samples corresponding to those channel resources (e.g., REs) to zero, e.g., prior to use in reception and/or decoding, such as prior to passing those samples to a receiver and/or decoding process. Forcing one or more received signal samples may improve the performance of a receiver, for example, by limiting the input interference and/or noise level where no meaningful information is transmitted.

One or more LTE-U sync signals may be used with a resource overlap. A WTRU may receive two or more LTE-U sync signals of different LTE-U eNBs on the same PRB sets and/or subframe sets. The two or more LTE-U sync signals may be configured considering orthogonal, e.g., CDM, principles, such that the WTRU may still detect its LTE-U sync signal in the presence of LTE-U sync signals from other LTE-U eNBs, which may cause interference. One or more techniques and/or design principles that may be related to CDM may be applied. For example, different OCCs and/or scrambling for the signals of the different eNBs may be applied.

An indication of LTE-U sync signal power offset may be provided. An eNB may, for example, transmit an LTE-U sync signal with a power level. The power level may be different than (e.g., a higher or lower power level) compared to other DL signals. An eNB may transmit a first LTE-U sync signal with a first power level and a second LTE-U sync signal with a second power level. A distinguished (e.g. higher or lower) LTE-U sync signal transmission power compared to other DL signals (e.g. other sync signals, PDSCH, (E)PDCCH, PHICH) may improve the synchronization, channel estimation, detection and/or other mechanisms of WTRUs.

A power level of a signal, e.g., a sync signal, may correspond to a total power transmitted (and/or received) in a set of resources confined in time and/or frequency. A set of resources confined in time may, for example, comprise one or more resources indicated and/or included in a single (or set or certain number of) radio frame(s), subframe(s), timeslot(s), OFDM symbols, etc. A set of resources confined in frequency may, for example, comprise one or more resources indicated and/or included in a single (or a set or certain number of) radio channels(s), PRB(s), subcarrier(s), etc. A set of resources confined in time and frequency may include a set of REs that carry a signal, such as a sync signal. A set of resources confined in time and frequency may include a set of OFDM and/or SC-FDMA symbols that may constitute a specific number of PRBs.

A WTRU may determine a power level of a signal, for example, by detecting the signal and/or measuring its received power level. A WTRU may determine a power level of a signal based on a received indication of power from other entities in the network, e.g., from its eNB (e.g., a serving eNB).

A WTRU may receive an indication of a power offset. The power offset may include a power offset (or potential power offset) between an LTE-U sync signal and one or more other DL signals. An indication may be provided to the WTRU by an eNB or network, e.g., by or via a PCell that may be associated or aggregated with the LTE-U cell. An indication may be provided to and/or received by the WTRU dynamically, e.g., via DL control signaling, or semi-statically, e.g., via higher layer signaling, such as RRC signaling.

A WTRU may determine a power offset. The power offset may be between the synchronization signal transmission and one or more other downlink transmissions. The WTRU may determine a power level of a second downlink transmission based on the power offset.

A WTRU may determine a received power offset as the power level difference between two DL signal transmissions, e.g., first_dl_signal and second_dl_signal, where, for example, the first_dl_signal may be received by the WTRU (or transmitted to the WTRU) prior to the reception (or transmission of second_dl_signal).

A WTRU may determine a first_dl_signal of an indicated power offset. For example, a WTRU may determine that a first_dl_signal corresponding to the received power offset may be the latest received sync signal prior to the reception of the power offset indication. As another example, a WTRU may receive an indication of a subframe, signal type and/or allocated resources of the first_dl_signal, e.g., as a part of a power offset indication.

A WTRU may determine a second_dl_signal of an indicated power offset. For example, a WTRU may determine that a second_dl_signal corresponding to a received power offset may include a next received DL signal (e.g. PDSCH, (E)PDCCH) after the reception of a power offset indication. In another example, a WTRU may receive an indication of subframe, signal type and/or allocated resources of the second_dl_signal, e.g., as a part of a power offset indication.

A WTRU may receive, e.g., as a part of DL grant, an indication of a power offset (e.g., a power offset). A power offset may be interpreted, for example, as an amount of power that a data signal (or a control or reference signal) may be reduced compared to a power of an LTE-U sync signal. A power offset may be determined, for example, as a power level (e.g. transmitted power level per PRB) difference between corresponding signals, e.g., first_dl_signal and second_dl_signal. A WTRU may determine (e.g., interpret) a first_dl_signal as the last received sync signal prior to reception of a power offset indication. A WTRU may determine a sync signal power level via measurement. A WTRU may interpret a second_dl_signal as the next PDSCH (or (E)PDCCH) signal. A WTRU may determine a power level of a second_dl_signal (e.g. the next PDSCH) as a summation of a measured power level of the first_dl_signal (e.g. the latest sync signal) and the indicated power offset level. The summation may be scaled and/or adjusted by the number of resource blocks (e.g. PRBs) of both first_dl_signal and the second_dl_signal. A WTRU may determine the power of the other signal using the indicated power offset, for example, using the power level of a LTE-U sync signal and/or the power level of the data (or control or reference) signal.

A WTRU may interpret a first_dl_signal as a next sync signal following reception of a power offset indication. A WTRU may measure a sync signal power level. A next sync signal may be prior to, partially overlap in time with, or be in the same subframe as the second_dl_signal.

A WTRU may receive an indication of a power level of the LTE-U sync signal. A WTRU may receive an indication of a power level of one or more control and/or data signals.

A WTRU may perform frequency estimation, timing estimation and/or synchronization (e.g., using a sync signal). The WTRU may use a sync signal for channel estimation. The WTRU may use the sync signal for coherent demodulation and/or symbol scaling. For example, the WTRU may use the sync signal for channel estimation. The WTRU may use the estimated channel and/or an indicated power offset between the sync signal and data/control signal (e.g., to properly scale the detected symbols prior to performing symbol demapping, prior to performing calculation of soft information, prior to performing calculation of bit probability and/or any other procedures prior to performing channel decoding process).

A WTRU may perform frequency and/or timing estimation. The frequency and/or timing estimation may be based on a synchronization signal transmission. The WTRU may perform demodulation and/or resource symbol scaling. The demodulation and/or resource symbol scaling may be based on a synchronization signal transmission.

The use of an LAA channel by different networks and/or operators may result in cell ID collisions among cells (e.g., SCells) in an LAA channel. Cell ID may be determined such that cell ID collisions may be avoided or reduced. For example, the cell ID of an LAA SCell may be determined based on one or more of: an identifier of the eNB, such as a cell ID, the cell ID of the PCell of the eNB, the operator of the eNB, the center frequency of the licensed band used by the eNB, the center frequency of the unlicensed band used by the LAA SCell, or a random seed, etc.

The cell ID may be determined upon deployment of LAA SCell. The cell ID of an LAA SCell may be obtained when using, intending to use or deploying the LAA SCell. The eNB may autonomously select a cell ID for the LAA SCell.

A WTRU that may be served by an LAA SCell may be informed, e.g., via a PCell, of the timing to take an action with respect to the LAA SCell. The information that may be provided, e.g., by the PCell, may include a cell ID of the LAA SCell and/or timing for when such a cell ID may apply to or be used by the LAA SCell. For example, a WTRU may be configured with an LAA SCell and/or an indication of when actions such as synchronization, measurements, and/or PDSCH transmission may occur. One or more WTRU actions that may be taken for an LAA SCell may be previously scheduled. The scheduling may be implicit or explicit. A WTRU may expect signals from an LAA SCell using a certain a cell ID after (e.g., only after) receiving indication of the cell ID and/or after the time when the cell ID may be applicable, which may be provided or configured by the eNB via the PCell. For synchronization or measurements, the WTRU may (e.g., may only) use RS samples at valid times which may be indicated by the PCell. Using RS samples at certain times indicated by the PCell may enable multiple LAA SCells in a single LAA channel, which may be controlled by different eNBs to reuse the same cell ID. There may not be cell ID confusion at the WTRU, for example, as signals transmitted by other LAA SCells using the same cell ID as the WTRU's configured LAA SCell may not occur at times considered valid by the WTRU.

Cell ID may be configured in a distributed fashion. When an eNB may use, intend to use, or deploy an LAA SCell, the eNB may select a cell ID. The cell ID may be selected such that collision within an LAA channel may be avoided. For example, an eNB that may configure an LAA SCell may communicate or negotiate with other eNBs, possibly using an information exchange message as described herein, to enable the eNB to select a cell ID that may not already be in use, for example within the geographic area and/or on the LAA channel. Such a communication or negotiation may be performed via broadcasting. For example, an eNB may broadcast the selected cell ID for an LAA SCell. The broadcast message may be on an LAA channel (possibly the LAA channel where the cell may operate) and/or on the licensed spectrum. One or more other (e.g., neighboring) eNBs may reply, possibly indicating whether or not there may be a conflict with one of their deployed LAA SCells.

Prior to using or deploying an LAA SCell, the eNB may listen on the LAA channel and, for example by discovery procedures, may attempt to determine the cell IDs of the cells that may be deployed on the LAA channel. The eNB may use another cell ID that may not collide with a currently deployed LAA SCell. If the eNB may determine that an LAA SCell (or a cell ID) may not have been active on an LAA channel for a certain (e.g., pre-configured) amount of time, the eNB may determine that the cell ID may no longer be in use. The eNB may use the cell ID for an LAA SCell that it may use or deploy.

Cell ID may be dynamically configured/indicated. For WTRU actions that may be related to an LAA SCell, the PCell that may schedule such actions may indicate a cell ID to use or assume. A virtual cell ID may be used. An LAA SCell may change cell IDs, for example between active times. The WTRU may or may not be aware of whether a new cell ID represents a cell that previously used an old cell ID. Quasi co-location between old and new cell IDs may be provided to or configured in the WTRU, for example to enable faster synchronization. For example, measurements taken on previous measurement occasions may be used in conjunction with current measurements. Cell ID (or virtual cell ID) hopping may be pre-configured, and the WTRU may know the cell ID (or virtual cell ID) hopping sequence, and may operate correctly without the new (virtual) cell ID being dynamically indicated.

An LAA SCell may use channel hopping. For example, an eNB may deploy an LAA SCell over multiple channels. An LAA SCell may be active on (e.g., only on) a single channel at a given time. The configurations of the LAA SCell may be kept consistent, except for the center frequency. For example, the cell ID of the LAA SCell may remain constant regardless of the LAA channel of each active time. The cell ID of the LAA SCell may be based on the time and/or the LAA channel, and may change per active time. The WTRU may be aware of the relationship between active time, LAA channel and cell ID. The WTRU may or may not receive dynamic indication. The cell ID of the LAA SCell relevant to a new active time may be indicated to the WTRU. The WTRU may use such information to determine the LAA channel where the LAA SCell may be active.

One or more eNBs may use and/or operate in one or more LAA channels. An eNB that may use and/or operate in an LAA channel may be considered to have, use, or operate an LAA cell such as an LAA SCell. An LAA cell or SCell that may belong to an eNB may compete for resources of an LAA channel with another LAA cell or SCell that may belong to another eNB. This competition may be in addition to or instead of competition with other users of the channel such as WiFi users or radar.

Multiple eNBs may share information and/or an LAA channel, for example, to enable fair and/or efficient use of an LAA channel between each other and other users. An LAA channel may be shared and/or used by one or more eNBs that may be associated with different operators. For example, an LAA channel may be shared and/or used by one or more eNBs simultaneously, in a TDM manner and/or in an FDM manner.

In some examples, the terms communicate and negotiate may be used interchangeably.

LAA cell parameters may be communicated. The eNB may deploy or operate one or more LAA cells or SCells which may be on the same or different unlicensed channels. An eNB may obtain a list of unlicensed channels on which it may monitor traffic. Such monitoring may enable the eNB or one or more LAA cells or SCell(s) to acquire the channel(s), for example, for downlink transmissions.

An eNB may use or, wish or intend to use, an LAA channel. The eNB may communicate and/or negotiate (e.g., with another eNB that may or may also use or intend to use the channel), for example, to obtain or determine one or more LAA cell parameters. The LAA cell parameter(s) may be for the eNB or the other eNB to use for a cell (e.g., an LAA SCell) associated with the channel.

An LAA cell parameter may include one or more of: cell ID (e.g., of the LAA cell), synchronization signal configuration or information, reference signal configuration or information, busy signal configuration or information, and/or active time configuration or information.

Synchronization signal configuration or information may include information regarding the resources that may be used by the cell for transmission of synchronization signals.

Reference signal configuration or information may include information regarding the reference signals (e.g. CRS, CSI-RS, CSI-IM, DM-RS, PRS), which may be transmitted in the cell such as which reference signals may be transmitted in the cell and/or information regarding the resources which may be used by the cell for transmission for one or more (e.g., each) of the reference signals.

Busy signal configuration or information may include information regarding the resources which may be used by the cell for transmission of busy signals.

Information regarding resources for transmission (e.g., of synchronization signals, reference signals, and/or busy signals), may include, but not limited to, one or more of: RE mapping, subframe configuration and/or offset, orthogonal cover code (OCC), cyclic shift, random sequence generator parameters, relevant PRB(s), among others.

Active time configuration or information may include time occasions or a pattern (or patterns) indicative of time occasions when an LAA cell (e.g., SCell) may become or attempt to become active or ON or when an eNB may turn or attempt to turn an LAA cell (e.g., SCell) active or ON. An eNB, such as one which may monitor an LAA channel, may determine or negotiate (with one or more other eNBs) time instances (or occasions) where it may attempt to acquire the channel and may turn an LAA cell (e.g., SCell) active or ON.

An ON or active LAA cell may transmit one or more synchronization signals, transmit one or more reference signals, transmit one or more busy signals, and/or transmit DL data and/or control signals.

An eNB may determine or obtain information regarding when another eNB may use or attempt to use an LAA channel (e.g., active time configuration or information). The eNB may not attempt to acquire the channel during all or part of that time. This may, for example, save power by not attempting to acquire a channel when it may be likely that it may be busy. This may reduce the possibility of colliding attempts to acquire a channel.

A WTRU may be configured with an LAA SCell. The configuration may coincide with the activation of a SCell (e.g. the LAA SCell) at the WTRU. The parameters may be configured at the WTRU. The parameters may enable the WTRU to be served by the LAA SCell. The parameters may include one or more LAA cell parameters. The value of an LAA cell parameter may be (or may have been) negotiated, obtained, or determined by an eNB, for example based on communication or information exchange with another eNB. The value of an LAA cell parameter may or may not be the same value provided to or configured in the WTRU (e.g., by the eNB). For example, an eNB may obtain or determine certain one or more resources for the transmission of a synchronization signal. The eNB may configure the WTRU with resources that may be the same as, different (or partially different) from, overlapping with, or a subset of the certain resources.

The eNB may configure the WTRU with one or more Quasi co-location (QCL) assumptions or sets of assumptions, for example between a LAA SCell and the PCell. A QCL assumption may be for one or more of: delay spread, average delay, Doppler spread and Doppler shift. A WTRU may be configured with a set comprised of multiple QCL assumptions, for example dynamically or semi-statically.

An LAA cell may be withdrawn. For example, When an eNB may not (e.g., may no longer) use or intend to use an LAA channel, the eNB may withdraw a corresponding LAA SCell. For example, when the eNB may stop monitoring a certain LAA channel, the eNB may withdraw a SCell that the eNB may have configured for use or operation in the certain LAA channel.

Such withdrawal may mean that one or more (e.g., all) configured and/or reserved resources for the LAA SCell may be released (e.g., by the eNB). The LAA SCell or the eNB may indicate to one or more LAA SCells (e.g., neighboring LAA SCells) that may use or operate on the affected LAA channel, or eNBs, that it may be releasing the LAA SCell and/or one or more (e.g., all) of its resources.

An eNB may withdraw an LAA SCell from an LAA channel based on one or more of channel congestion, traffic load, number of failed attempts in acquiring the channel, number of eNBs or cells competing for the LAA channel, interference measurements, and/or one or more of typical, average, or peak delay in acquiring the channel. One or more of the criteria may be measured or determined by the eNB and/or the WTRU. One or more criteria, which may be measured or determined by the WTRU, may be signaled to the eNB by the WTRU. The eNB may withdraw the LAA SCell if one or more of the criteria may exceed or fall below a certain threshold.

An eNB may determine the number of competing deployed and/or active LAA SCells that may be operating on an LAA channel. If the eNB determines that there may be too much competition (e.g., too many other LAA SCells in the channel), the eNB may not use the channel or may withdraw an LAA SCell from the channel.

For example, an LAA SCell may be deployed to operate (e.g., only operate) on an LAA channel on a condition that there may be fewer than x competing LAA SCells in the same LAA channel. When a first LAA SCell (e.g., the eNB of a first LAA SCell) determines that a new LAA SCell may have entered (e.g., may have been deployed and/or may have become active in) the LAA channel and/or that the total number of competing LAA SCells may (or may now) exceed a certain threshold, the first LAA SCell may be withdrawn.

A first LAA SCell (e.g., the eNB of a first LAA SCell) may negotiate with a second LAA SCell (e.g., the eNB of a second LAA SCell) for resources (e.g., for critical or high importance use of the LAA channel). Based on the negotiation, the one or more of the LAA SCells or eNBs may determine that there may not be enough resources to satisfy scheduling requirements, and an LAA SCell (e.g., the one that may not have enough resources of the LAA channel) may be withdrawn from the LAA channel.

An LAA cell may be configured or deployed, for example with intent to use the cell in the channel. One or more examples described for withdrawing may be applied to configuring or deploying a cell where the decision making criteria may be the same or the opposite as that described (e.g., exceed a threshold may be replaced by be below a threshold, not enough may be replaced by enough, etc.).

LAA channel information may be exchanged. For example, eNBs may share information about their current or future use of one or more LAA channel(s). Such exchange of information may be used for the negotiation or sharing of resources between LAA SCells as described herein.

The exchange of information between eNBs may be via an X2 or X2-like interface. The exchange of information may be pro-active (e.g., an eNB may transmit information to another (e.g., neighboring) eNB before an issue arises from the use of the LAA channel) or reactively (e.g., an eNB may transmit information to another (e.g., neighboring) eNB once an issue has arisen from the use of the LAA channel).

The exchange of information between eNBs may be via broadcast messages. Over-the-air broadcasting of information may be used for the transfer of information regarding the current or future use of one or more LAA channel(s), e.g., by an eNB or LAA cell. Such a message may be unidirectional.

The broadcasted message may trigger neighboring cells that are affected by the information contained to respond to the broadcasted message, possibly by its own broadcasted message or by any other means described herein.

The message may be broadcasted from a PCell or a cell using licensed spectrum. The broadcast message may be relevant for use of one or many LAA channels. The broadcast message may originate from an LAA SCell (or a cell using an unlicensed band). The information exchanged via a broadcast message may be relevant to (e.g., only to) the LAA SCell (or LAA channel being used by the LAA SCell).

The broadcasted message may be included in a MIB and/or SIB. An LAA MIB and/or SIB transmission may be used to transmit these messages. For example, a MIB and/or SIB may be transmitted in a subset of resources, for example, when an LAA SCell may have acquired a channel. For example, a MIB and/or SIB may be transmitted in certain (e.g., a subset of or all the) subframes, and in one or more RBs or subcarriers, possibly a group of center RBs or subcarriers in a center RB.

The MIB and/or SIB resources may be semi-statically assigned to an LAA SCell and may limit collision with simultaneously operated LAA SCells. The MIB and/or SIB may be transmitted when the LAA SCell is (or is not) active. The MIB and/or SIB may use repetition encoding. For example, the message that may be included in the MIB and/or SIB may be repeated every x subframes within an active time.

There may be reserved resources on every LAA channel. A deployed LAA SCell on the channel may be allocated with a set of such resources for broadcasting relevant messages about the current or future use of the LAA channel, to neighbor LAA SCells. For example, there may be one or more of reserved symbols/time slots/subframes and subcarriers/PRBs/subbands. An LAA SCell may control such resources, for example, by having previously successfully acquired the LAA channel or having negotiated semi-static possession of such resources. The LAA SCell may broadcast relevant information.

The broadcast message may use LAA SCell-specific reference signals that may enable WTRUs or other LAA SCells to demodulate the message. For example, broadcast messages may be transmitted on one or more antenna ports and/or may use pre-configured precoding and/or CRS-like signals for demodulation. Scrambling and/or frequency hopping may be used on the broadcasted message, for example, such that the effect of interference to and from nearby LAA SCells and other RAT access points may be reduced.

There may be specific resources that may be tied to the time when an LAA SCell has or may have acquired the LAA channel. The LAA SCell may transmit a broadcasted message in such resources. For example, in the xth symbol(s) after acquiring a channel, an LAA SCell may transmit the broadcasted message.

L1 signaling or channels may be used for information exchange. The information about the current or future use of the LAA channel may be indicated by (or by use of) one or more L1 signals or channels. The busy signal, the synchronization signal(s), and/or the reference signal(s), etc., may indicate relevant information. A parameter of a signal and/or channel may indicate information on the current or future use of the LAA channel. For example, a transmission on a first set of REs may indicate a first information exchange message, a transmission on a second set of REs may indicate a second information exchange message, and a transmission on both sets of REs may indicate a third information exchange message. The parameter of a signal that may be used to indicate information of an LAA SCell's use of one or more LAA channels may include, but not limited to, the resources used with a subframe, the (virtual) cell ID which may be used to generate a sequence of the signal, the cyclic shift of the signal, the orthogonal cover code of the signal, and/or the antenna ports on which the signal may be transmitted. For example, the RB, symbol or REs used to transmit a signal may indicate a specific message.

For example, a reference signal (RS) may be configured with a set of possible transmission resources (e.g. RE mapping, set of PRBs, pseudo-random sequence, OCC, etc.) and the use of a specific set of resources for a transmission of the RS may inform neighboring cells of relevant information.

For example, an RS that may be sent in a certain (e.g., the last) subframe before the LAA SCell releasing the LAA channel and/or switching to inactive (or dormancy) may use one set of resources. The same (or another) RS that may be sent in another (e.g. any other) subframe may use another set of resources. An eNB or cell may monitor for the RS and/or use the placement of the RS of another (e.g., neighbor) LAA cell to determine usage or intended release of the channel by the other LAA cell.

The resources used for an RS in the last subframe of active time may indicate whether the LAA SCell will remain deployed upon going to dormancy or whether it will abandon the LAA channel. The resources used for a synchronization signal sent when an LAA SCell becomes active may indicate the length of time it will remain active. The resources used to transmit a busy signal or synchronization signal at the beginning of active time may indicate the resources that may be reserved and/or used during that active time or future active times. This may enable the concurrent or simultaneous use of the LAA channel by different LAA SCells.

An L1 signal and/or channel may be used for exchanging information about the current or future use of the LAA channel. Such information may be explicitly indicated within the channel/signal (e.g. by encoding information elements within signal/channel). Such information may be indicated in a manner similar to that explained above for certain signals. The channel may be scheduled via (E)PDCCH, possibly by using a new DCI Format. For example, the channel parameters may be indicated in a DCI Format that may possibly be detected using an RNTI. The RNTI may be used by the LAA SCells on one or more LAA channels, or may be LAA SCell-specific. The RNTI may be configured upon LAA SCell deployment. The (E)PDCCH scheduling the message transmission on the channel may indicate information such as, but not limited to, the resources (e.g. RBs) used for the transmission of the message on the new channel, the timing of the message with respect to the (E)PDCCH transmission, the modulation and coding scheme, and/or the demodulation reference signal parameters (e.g. antenna ports, orthogonal cover code, cyclic shift, quasi co-location assumptions, precoder, transmit power ratio between the demodulation reference signal and other reference signals). For example, the timing of the message with respect to the (E)PDCCH transmission may indicate that the message may be transmitted in the same subframe as the (E)PDCCH. The timing of the message with respect to the (E)PDCCH transmission may indicate that the message may be transmitted in a possibly indicated or pre-configured subframe following the transmission of the (E)PDCCH.

The channel may include a control region indicating the parameters of the scheduled information exchange message may be indicated. The parameters included in the control region of the channel can be any of those described herein for (E)PDCCH. The LAA SCell may pre-configure a portion (e.g. a set of RBs or REs) of the channel for control information.

The resources associated with the channel may be allocated on a sub-TTI basis. For example, the channel may be transmitted on one of the two time slots in a TTI. The channel may be defined over a set of symbols within a time slot. The channel may be defined over a set of symbols spanning multiple time slots and/or subframes. The transmission power used for the channel may be different from that used for other channels. The control region of the channel may indicate a transmission power offset between the channel and possibly one or more other signals and/or channels. The channel may include some REs dedicated to the transmission of a demodulation reference signal.

A beacon may be transmitted by an LAA SCell in order to transmit information regarding its current or future use of the LAA channel. Such a beacon may be transmitted at pre-configured times. The beacon may be transmitted when the LAA SCell is not in active mode. There may be collisions between beacons and other LAA SCells (or other RATs) using the LAA channel. Such a beacon may be transmitted on resources that have been previously negotiated between the deployed LAA SCells sharing the LAA channel. An LAA SCell that is active when other LAA SCells transmit their beacons may use blanking patterns on the resources used for the beacon. This may limit the interference experienced by its WTRUs.

Some resources of the LAA channel may be fixed for beacon transmission by the active LAA SCell or any other LAA SCell. For example, the beacon may be transmitted at pre-configured and possibly fixed or variable time instances (OFDM symbol(s), time slot(s), subframe(s)) and on a subset of subcarriers by an active LAA SCell. The beacon may include an indication of the LAA SCell that is transmitting it (e.g. cell ID). Some resources may be reserved and used as a beacon by other LAA SCell that is currently deployed but dormant. In order to avoid collisions between multiple dormant LAA SCell, the specific resources (e.g. REs or OCC) may be determined based on the cell ID of the LAA SCells. The beacons, regardless of whether an LAA SCell is active or dormant, may have resources determined based on a parameter of the LAA SCell (e.g. cell ID).

Information may be exchanged via one or more WTRU (s). A WTRU may serve as an intermediary for information exchange between multiple eNBs. An eNB may configure a WTRU with an LAA SCell and with such a configuration, the WTRU may be instructed to listen for possible information messages being transmitted by one or more LAA SCells sharing the same LAA channel. The message that the WTRU listens to may use any of the aforementioned methods for information exchange. For example, a WTRU may listen for neighboring LAA SCell broadcast messages providing information on the use of the LAA channel. The WTRU may be provided UL resources, possibly in the form of an UL grant to its PCell, to report the information that it has gathered from the broadcast message of one or more neighboring LAA SCells.

The information gathered by the WTRU may be passively transmitted by neighboring LAA SCell. Passive transmission of information means that the neighboring LAA SCell is not actively attempting to exchange information with other LAA SCells, but that its current behavior in the LAA channel can enable a WTRU or other LAA SCells to make assumptions as to its use of the LAA channel. For example, a WTRU may perform discovery and may make measurements on neighboring LAA SCell transmissions. The WTRU may feedback the measurements. Based on the measurements, the WTRU's serving cell may determine parameters for specific LAA SCells using the LAA channel and/or parameters of the general use of the LAA channel by the configured LAA SCells. For example, the WTRU may be configured with measurements on neighboring LAA SCells. For example, the WTRU may be given a threshold value and may determine the amount of time the neighboring LAA SCells may have transmissions that may generate a measurement greater than the threshold value. This may enable the WTRU, and by extension the eNB, to determine the activity level of a neighboring LAA SCell.

A WTRU may be given information from its serving cell to share with other eNBs. For example, a WTRU may be provided with information on the current or future use of an LAA SCell by its PCell. Furthermore, the WTRU may be given resources to attempt to connect to a neighboring cell (in a licensed band and/or in the unlicensed band, if the unlicensed band allows UL transmissions). Such resources can include a cell ID, Physical Random Access Channel (PRACH) parameters (preamble and resources), timing reference and possibly UL grant. The WTRU may enable information exchange by connecting to a neighboring cell in the licensed band. The serving cell may know the cell ID of the neighboring LAA SCell in the LAA channel. The serving cell may or may not know the appropriate licensed cell that is operated by the same eNB. The serving cell determine appropriate licensed cell based on a relationship between cell IDs of LAA SCells and their related license-band PCells. The WTRU may attempt to connect to one or more neighboring cells to transmit the information. The WTRU may transmit information for its serving cell (or its serving eNB's LAA SCell(s)) via UL resources. Such resources can be listened to by a neighboring cell to determine if there is any relevant information being exchanged. The WTRU's transmission may include an identifier of the LAA SCell (or eNB) from which the information is coming from and/or an identifier of the LAA SCell for which the information is intended.

The WTRU may communicate with a neighboring eNB to initiate setting up a direct link between the serving eNB and the neighboring eNB. For example, a WTRU may transmit relevant information (e.g. serving cell ID) to a neighboring cell, and the neighboring cell may set up an interface to the serving cell to exchange information.

The message used to exchange information between two eNBs may enable efficient use of one or many LAA channels. The terms message and indication may be used interchangeably herein, and may refer to any information originating from an eNB (or a deployed LAA SCell) that may be used by another eNB (or another deployed LAA SCell). This message or indication may include anything relevant to current or future use of one or more LAA channels and the contents are further described herein.

The message may be transmitted periodically between eNBs. For example, upon deploying an LAA SCell, an eNB may begin periodic transmission of its use of the LAA channel via one or more of the interfaces described herein. Such a periodic transmission of the message may be unidirectional. For example, the eNB may not expect any reply from neighboring eNBs. Periodic transmission of the message may lead to periodic or aperiodic replies from neighboring eNBs. The message may be aperiodic, for example, a single-shot transmission of the message. The eNB may transmit relevant information in a message and may or may not expect a reply (e.g. an acknowledgment) from neighboring eNBs.

An information exchange message may (e.g., may always) be transmitted when an LAA SCell is deployed (possibly regardless of whether the LAA SCell is active or dormant). The message may be transmitted only in one of dormant or active state. A different set of resources or interface may be configured for information exchange in active state and information exchange in dormant state.

The message may be triggered by the eNB transmitting the message. For example, an eNB may wish to inform neighboring eNBs of its current use of an LAA channel via an LAA SCell and may transmit a message. The message may be prompted by another eNB. For example, a first eNB may wish to know the status (e.g. the channel monitoring set) of a second eNB. The first eNB may send a triggering message, which may prompt the other eNB to transmit a message indicating its status. The triggering message may in and of itself be considered an information exchange message. The triggering message may lead to a one-shot transmission of the message reply and/or may possibly trigger periodic transmission of the message.

The parameters of the message may depend on the active or inactive (e.g., dormant) state of the LAA SCell. For example, a dormant cell may transmit messages when prompted. An active cell may transmit messages periodically. The timing of a periodic message may be relative to the PCell and/or may be relative to timing of the LAA SCell. For example, an LAA SCell that is asynchronous to the PCell (and whose timing during an active time may depend on the time the LAA SCell acquired the LAA channel and became active) may transmit information exchange messages as a function of the time when the LAA channel was acquired.

The message may be used to convey information about the current or future use of one or more LAA channel(s). The message may be transmitted via an interface or mechanism such as one described herein. The message may originate from one or more of: an eNB with one or more deployed LAA SCells that is currently active in an LAA channel, an eNB with one or more deployed LAA SCells that is currently dormant in an LAA channel, an eNB without a deployed LAA SCell in one or more LAA channels, an LAA cell or SCell, a cell in licensed spectrum such as a PCell, or the like.

The information that may be contained within the message to be transmitted between two or more eNBs (or LAA SCells) may enable fair and efficient use of one (or more) LAA channel(s). The information in the message can be used for unidirectional transmission. For example, the message may indicate one eNB's current or future use of an LAA channel. The information in the message can be used for bidirectional transmission. For example, the information may enable a negotiation between multiple eNBs to achieve fair and efficient use of the LAA channel(s).

The information exchange message may include an identifier (e.g. cell ID) of the source of the information exchange message. For example, the cell ID of the eNB's cell in licensed spectrum, or of an LAA SCell. The message may or may also include a list of deployed LAA SCells possibly over multiple LAA channels. The list may include recently withdrawn LAA SCells (or LAA SCells that will become withdrawn imminently). This may enable neighbor eNBs or LAA SCells to track the traffic in LAA channels.

The information exchange message may include an identifier (e.g. cell ID) of the intended destination of the message. For example, the cell ID of the destination eNB's cell in licensed spectrum, or the cell ID(s) of one or more LAA SCells.

The information exchange message may include a channel monitoring set. An eNB may indicate (e.g., to a neighboring eNB) its channel monitoring set. For example, the message may include a list of channels that the eNB may be monitoring and/or may attempt to acquire. A monitored channel may be one with one or more deployed LAA SCells. The channel monitoring set may include channels which may be one or more of: 1) not monitored, 2) monitored but without deployed LAA SCell, 3) monitored and with deployed LAA SCell. The eNB may indicate in the message a (e.g., some or all) change(s) to its channel monitoring set. For example, a message may include the full list of channels being monitored, or may (e.g., may only) include updates to a previous set (possibly in the form of channels to be added or removed from the channel monitoring set or changes to the type of monitoring on each channel).

The information exchange message may include timing of the current active time of an LAA SCell. The information may indicate the beginning of the current active time, the end of the current active time, the length of the entire active time, the remaining duration of the current active time. For certain systems such as synchronized systems, the timing information may be with reference to the PCell of the source eNB. For certain systems such as asynchronous systems, the message may (or may also) indicate a time reference at the moment of the exchange of information (or an indication to another timing reference). This may enable the destination eNB or LAA SCell to understand the relative timing contained in the information exchange message.

The information exchange message may indicate timing of the desired future active time. This may include indication (s) of one or more of the beginning of the desired active time, the end of the desired active time, and the length of the entire desired active time.

The information exchange message may include an indication of timing of deploying/withdrawing of an LAA SCell. The source eNB may indicate when it may deploy or withdraw one or more LAA SCells.

The information exchange message may include the type of LAA channel access. The message may indicate whether synchronous access (e.g., the LAA SCell may be synchronized to the PCell) or asynchronous access (e.g., the LAA SCell's timing may depend on the time when the LAA channel may be acquired). The type of LAA channel access may be decoupled from the timing of the message. The type of LAA channel access may be indicated in the message. For example, the message transmission may be scheduled according to timing synchronized with the PCell. The data transmissions on the LAA SCell may be asynchronous. The LAA SCell data transmissions may use a blanking pattern (e.g., zero-power transmissions) on some REs to enable the transmission of the message.

The information exchange message may include the LAA SCell transmission power. The transmission power may be fixed for the RBs and/or the subframes within an active time. The transmission power may vary over subframes and/or RBs of an active time. This may enable concurrent or simultaneous use of an LAA channel by multiple LAA SCells. Variable transmission powers may be indicated by a transmission power pattern, where a (e.g., every) subgroup of RBs and/or subframes of an active time may have a value assigned that can be anywhere between 0 and a pre-configured maximum transmission power.

The information exchange message may indicate a level of interference. The message may include an indication of the interference level in the LAA channel, for example as experienced by the LAA SCell and/or by WTRUs served by the LAA SCell. Such interference values may be explicit. The interference levels may be quantized and/or represented by, for example, low, medium and high. The interference level may represent the interference measured in the LAA channel, and/or the interference that may be acceptable to the source LAA SCell for current or future active times.

The information exchange message may include resource priority information or patterns. A source eNB may indicate different levels of priority for resources of either its active time transmissions or, if possible, dormant time transmissions. Such priority levels may be represented as a pattern of different priorities for one or more of RBs and/or symbols/time slots/subframes. The priority pattern may indicate how the eNB may and/or will prioritize usage. This may enable neighboring LAA SCells to make use of lower priority resources. The information exchange message and/or the priority pattern may include or indicate the set of resources that may be used for busy or sync signals. This information may be used to enable coordinated and/or joint transmission of busy signals by multiple LAA SCells in an LAA channel.

The information exchange message may include an indication of (or a request for) high priority resources. An eNB (or LAA SCell) may indicate, for example on the same or different LAA channels, the priority with which it may, or may request to, acquire an LAA channel. For example, a LAA SCell such as a dormant LAA SCell may request or intend to use a channel for a high priority purpose such as to transmit sync signals to its served WTRUs, for example to enable the WTRUs to maintain synchronization. The transmission of (e.g., or a request for) high priority resources may trigger a backoff operation at another (e.g., neighboring) LAA SCell, for example to enable the LAA SCell transmitting the high priority indication a higher likelihood of acquiring the LAA channel.

The information exchange message may include an indication of detection of radar activity. An eNB (or LAA SCell) may indicate to another eNB (or LAA SCell) that radar has been detected on an LAA channel. This may enable neighboring eNBs to stop attempting to acquire the LAA channel and/or may lead to eNBs withdrawing LAA SCells on the LAA channel.

The information exchange message may indicate long term behavior. This may indicate to a recipient of the message the type of LAA channel use the source LAA SCell may expect over longer period of time. For example, the source LAA SCell may indicate the amount or type of traffic that may be expected for the WTRUs served by the LAA SCell. For example, the source LAA SCell may indicate whether the traffic may be expected to last for multiple active times and/or how many active times. The message may include the rate at which the LAA SCell may attempt to acquire the LAA channel in the future. The amount of traffic may be indicated in or by a report similar to a buffer status report. The message may include the number of WTRUs that may be served by the LAA SCell.

The content of the message may be explicitly included within the message or may be implicitly included (e.g., determined based on one or more parameters or characteristics of the message or the transmission of the message). For example, a parameter or characteristic of the information exchange message (e.g. resources used to transmit the message, such as subframes and/or PRBs) may implicitly indicate one or more of the possible contents of the message (e.g. the remaining duration of an active time) as described herein.

LAA channel resources may be shared between/among eNBs. Information exchange messages may be used by eNBs to share LAA channels.

A first eNB may deploy a first LAA SCell. The eNB or LAA SCell may indicate, e.g., using one or more of the solutions described herein, that it may be (or may be becoming) active and/or may be active for a specific duration x (which may be measured in symbols, time slots, subframes, etc.). A second eNB or LAA SCell may negotiate with the first eNB/LAA SCell to share one or more channels. The second eNB (or second LAA SCell) may, for example via an information exchange message, indicate to the first eNB (or LAA SCell) one or more of: a desire or request to use or share a number of or a certain set of RBs, and/or an amount of time for which the RBs may be desired or requested that may be less than the remaining active time of the first LAA SCell.

The first LAA SCell may agree with the request and may not or may stop scheduling on the RBs indicated by the second LAA SCell, for example for the requested amount of time. The first LAA SCell may indicate to the second LAA SCell a set or another set of resources (RBs and/or subframes) where the first LAA SCell may not transmit and/or where the second LAA SCell may transmit.

The set of RBs that a second LAA SCell may desire or request, and/or that the first LAA SCell may free up to enable the second LAA SCell to transmit data, may comprise part or all of the bandwidth of the LAA channel. During the time (e.g., a subset of subframes) when the second LAA SCell may have the channel, the first LAA SCell may remain active but may not transmit.

A second LAA SCell may ask for (and/or a first LAA SCell may provide) a set of RBs where the first LAA SCell may reduce its transmission power such that the second LAA SCell may perform simultaneous transmissions on the same RBs.

The second eNB (or second LAA SCell) may, for example via an information exchange message, indicate to the first eNB (or LAA SCell) a desire or request to acquire the LAA (e.g., complete LAA) channel before the end of the first LAA SCell's active time which may have been previously indicated.

If the first LAA SCell may agree, it may return to inactive (or dormant) state before the time it had originally indicated or intended. The first LAA SCell may collaborate with the second LAA SCell to ensure that the channel remains (or appears to remain) busy during the switching time where the second LAA SCell may acquire the channel. This may deter other cell or access point from acquiring the channel before the second LAA SCell begins its transmission. The second LAA SCell may keep the channel for (e.g., up to) as long as a cell may be allowed to keep a channel, which may be independent of how long the first LAA SCell may have had the channel. The second LAA SCell may keep the channel for as long as the first LAA SCell had remaining on its active time period. The time remaining may depend on an indication sent by the first LAA SCell or may depend on regulatory allowed maximum active time period for LAA channel acquisition.

The second eNB (or second LAA SCell) may, for example via an information exchange message, indicate to the first eNB (or LAA SCell) a request for an interference report from the first LAA SCell's connected WTRUs. The first LAA SCell may trigger an interference measurement report from its WTRUs, for example to determine if the second LAA SCell may transmit simultaneously without appreciably degrading the first LAA SCell's WTRUs performance. The measurement resources that may be used by the WTRUs may be previously negotiated between the first and second LAA SCell. The second LAA SCell may transmit a dummy interference signal, for example to enable the first LAA SCell's WTRUs to measure (e.g., properly) the effect of potential transmissions from the second LAA SCell.

An interference request from the second LAA SCell may result in the first LAA SCell replying with an indication of interference. For example, the first LAA SCell may indicate one of two levels of interference: low (e.g., meaning the second LAA SCell may perform simultaneous transmission) or high (e.g., meaning the second LAA SCell should not perform simultaneous transmission). More than two levels of interference may be used for indication. The first LAA SCell may indicate to the second LAA SCell a set of precoding matrices that may or may not be used, for example to limit the interference which may be experienced by the first LAA SCell's WTRUs.

The second eNB (or second LAA SCell) may, for example via an information exchange message, indicate to the first eNB (or LAA SCell) a set of interference measurements that may have been taken by the second LAA SCell's WTRUs. This may enable the first LAA SCell to modify its transmission power, or precoding, for example to limit the interference which may be experienced by the second LAA SCell's WTRUs. The second LAA SCell may provide a list of favorable (or unfavorable) precoding matrices that the first LAA SCell may use (or may not use), for example to limit the interference to the second LAA SCell's WTRUs.

The second eNB (or second LAA SCell) may, for example via an information exchange message, indicate to the first eNB (or LAA SCell) a request for the first LAA SCell to transmit a signal (such as a busy signal). This may indicate to the second LAA SCell when (e.g., the precise or nearly precise moment that) the first LAA SCell may relinquish the channel. This may enable the second LAA SCell to have preferential access to the channel before other LAA SCells or other RATs. This may (e.g., may only) apply or be used for the transmission of high priority signals (e.g. the transmission of reference signals which may enable WTRUs to stay synchronized to the LAA SCell). An LAA SCell may (or may only) acquire (or be allowed to acquire) a channel in such a manner for certain transmissions such as high priority transmissions, and may have a limit on how long it may remain active after the transmission of the high priority signals.

The second eNB (or second LAA SCell) may, for example via an information exchange message, indicate to the first eNB (or LAA SCell) a request to jointly transmit a busy (or synchronization) signal by both the first and second LAA SCells. The transmission of such a signal may be done in the same resources, possibly to increase the received power of such a signal by other nodes or possibly to increase the coverage of such a signal. The transmission of such a signal may be done on orthogonal resources. For example, the first LAA SCell may transmit the busy signal in a first set of subcarriers of a symbol. The second LAA SCell may transmit the busy signal in a second set of subcarriers of the same symbol.

The second eNB (or second LAA SCell) may, for example via an information exchange message, indicate to the first eNB (or LAA SCell) a request to for the first LAA SCell transmits a synchronization signal which may enable the second LAA SCell to synchronize. The first LAA SCell may transmit a synchronization signal in response to the request. This may enable the two LAA SCells to share resources in simultaneous active times and may be used when LAA SCells may not be synchronized to their respective PCells.

The second eNB (or second LAA SCell) may, for example via an information exchange message, indicate to the first eNB (or LAA SCell the channel the second LAA SCell may select in an upcoming active time. The second LAA SCell may request the first LAA SCell to indicate the channel that it may use for its next active time. These solutions may enable the two LAA SCells to coordinate their efforts when dynamic frequency selection may be used. Two or more LAA SCells may negotiate to reduce the likelihood of attempting to acquire the same channels. The LAA SCells may employ dynamic frequency selection. An LAA SCell may indicate to another (e.g., a neighbor) LAA SCell a hopping pattern it may uses. The LAA SCells may negotiate to share resources of overlapped portions of channels.

For example, the first eNB or first LAA SCell may indicate to the second eNB or second LAA SCell that it has acquired an LAA channel. This indication may be sent in the form of a preamble. The indication may enable multiple LAA SCells to share the active time of the first LAA SCell simultaneously, for example using the same resources. The preamble may indicate one or more of the timing of the LAA SCell (to enable other LAA SCells to synchronize to the cell that originally acquired the channel), the timing/length of the active time (to enable other LAA SCells to know how long they can remain active), the LAA SCell's (virtual) cell ID, the LAA SCell's transmission power, and/or the LAA SCell's busy, and/or sync signal configuration.

The processes and instrumentalities described herein may apply alone or in any combination, may apply to other wireless technologies, and for other services.

A WTRU may refer to an identity of the physical device, or to the user's identity such as subscription related identities, e.g., MSISDN, SIP URI, etc. A WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A wireless transmit/receive unit (WTRU) comprising:
a processor configured to:
receive downlink control information (DCI) associated with a physical downlink shared channel (PDSCH) transmission, wherein the DCI includes information regarding a rate matching configuration associated with the PDSCH transmission;
determine, based on the information regarding the rate matching configuration associated with the PDSCH transmission, one or more resource elements to be rate matched around;
determine a total number of resource elements usable for the PDSCH transmission by skipping at least the one or more resource elements to be rate matched around;
determine a transport block size (TBS) for the PDSCH transmission based at least on the total number of resource elements determined to be usable for the PDSCH transmission; and
receive the PDSCH transmission, wherein the PDSCH transmission comprises a transport block with the determined TBS.

2. The WTRU of claim 1, wherein the information regarding the rate matching configuration indicates that the one or more resource elements to be rate matched around are to be skipped during de-mapping.

3. The WTRU of claim 1, wherein the processor is further configured to receive a synchronization signal, and wherein the synchronization signal comprises at least one of a primary synchronization signal (PSS), a secondary synchronization signal (SSS), a physical broadcast channel (PBCH), a cell-specific reference signal (CRS), a channel state information reference signal (CSI-RS), or a demodulation reference signal (DMRS).

4. The WTRU of claim 1, wherein the information regarding the rate matching configuration indicates one or more time or frequency resources to be rate matched around during reception of the PDSCH transmission.

5. The WTRU of claim 1, wherein the processor is further configured to perform frequency or timing estimation based on a synchronization signal.

6. The WTRU of claim 1, wherein the information regarding the rate matching configuration includes a rate matching indicator that identifies the one or more resource elements to be rate matched around.

7. The WTRU of claim 1, wherein the rate matching configuration is a first rate matching configuration, and wherein the processor is further configured to receive configuration information regarding a plurality of rate matching configurations that includes the first rate matching configuration, and the DCI indicates that the WTRU is to apply the first rate matching configuration of the plurality of rate matching configurations in association with the PDSCH transmission.

8. The WTRU of claim 1, wherein data associated with the PDSCH transmission is not mapped to the one or more resource elements that are rate matched around.

9. A method comprising:
receiving downlink control information (DCI) associated with a physical downlink shared channel (PDSCH) transmission, wherein the DCI includes information regarding a rate matching configuration associated with the PDSCH transmission;
determining, based on the information regarding the rate matching configuration associated with the PDSCH transmission, one or more resource elements to be rate matched around;
determining a total number of resource elements usable for the PDSCH transmission by skipping at least the one or more resource elements to be rate matched around;
determining a transport block size (TBS) for the PDSCH transmission based at least on the total number of resource elements determined to be usable for the PDSCH transmission; and
receiving the PDSCH transmission, wherein the PDSCH transmission comprises a transport block with the determined TBS.

10. The method of claim 9, wherein the information regarding the rate matching configuration indicates that the one or more resource elements to be rate matched around are to be skipped during de-mapping.

11. The method of claim 9, further comprising receiving a synchronization signal, wherein the synchronization signal comprises at least one of a primary synchronization signal (PSS), a secondary synchronization signal (SSS), a physical broadcast channel (PBCH), a cell-specific reference signal (CRS), a channel state information reference signal (CSI-RS), or a demodulation reference signal (DMRS).

12. The method of claim 9, wherein the information regarding the rate matching configuration indicates one or more time or frequency resources to be rate matched around during reception of the PDSCH transmission.

13. The method of claim 9, further comprising performing frequency or timing estimation based on a synchronization signal.

14. The method of claim 9, wherein the information regarding the rate matching configuration includes a rate matching indicator that identifies the one or more resource elements to be rate matched around during reception of the PDSCH transmission.

15. The method of claim 9, wherein the rate matching configuration is a first rate matching configuration, and the method further comprising:
receiving configuration information regarding a plurality of rate matching configurations that includes the first rate matching configuration, wherein the DCI indicates that the first rate matching configuration of the plurality of rate matching configurations is to be applied in association with the PDSCH transmission.

16. The method of claim 9, wherein data associated with the PDSCH transmission is not mapped to the one or more resource elements that are rate matched around.

17. The WTRU of claim 1, wherein the processor is further configured to:
   perform rate matching around the determined one or more resource elements based on the information regarding the rate matching configuration associated with the PDSCH transmission.

18. The method of claim 9, further comprising:
   performing rate matching around the determined one or more resource elements based on the information regarding the rate matching configuration associated with the PDSCH transmission.

* * * * *